United States Patent [19]
Sugawara

[11] Patent Number: 5,471,344
[45] Date of Patent: Nov. 28, 1995

[54] PHOTOGRAPHING APPARATUS HAVING OPTICAL LOW-PASS FILTER

[75] Inventor: Saburo Sugawara, Kawasaki, Japan

[73] Assignee: Canon Kabushiki Kaisha, Tokyo, Japan

[21] Appl. No.: 266,360

[22] Filed: Jul. 1, 1994

Related U.S. Application Data

[63] Continuation of Ser. No. 858,605, Mar. 27, 1992, abandoned.

[30] Foreign Application Priority Data

| Mar. 29, 1991 | [JP] | Japan | 3-065836 |
| Jun. 21, 1991 | [JP] | Japan | 3-177194 |
| Jun. 21, 1991 | [JP] | Japan | 3-177199 |
| Jun. 21, 1991 | [JP] | Japan | 3-177200 |
| Jul. 19, 1991 | [JP] | Japan | 3-203251 |

[51] Int. Cl.$^6$ ............... G02B 5/18; G02B 5/20; G02B 27/44; G03B 33/00
[52] U.S. Cl. ............... 359/566; 354/101; 354/102; 359/568; 359/569; 359/574; 359/891
[58] Field of Search ............... 359/566, 567, 359/569, 574, 575, 625, 626, 568, 891; 354/101, 102

[56] References Cited

U.S. PATENT DOCUMENTS

| Re. 20,748 | 6/1938 | Bocca | 359/569 |
| 2,182,993 | 12/1939 | Moreno | 359/569 |
| 2,189,751 | 2/1940 | Bocca et al. | 359/574 |
| 2,733,291 | 1/1956 | Kell . | |
| 3,716,666 | 2/1973 | Larsen | 359/566 |
| 3,821,795 | 6/1974 | Okano | 359/569 |
| 3,940,788 | 2/1976 | Abe et al. | 359/569 |
| 4,083,627 | 4/1978 | Okano . | |
| 4,384,210 | 5/1983 | Stauffer | 359/569 |
| 4,795,236 | 1/1989 | Ise | 359/569 |
| 5,016,954 | 5/1991 | Onayama et al. | 359/569 |
| 5,081,545 | 1/1992 | Sugawara et al. | 359/625 |

FOREIGN PATENT DOCUMENTS

| 52-222247 | 6/1977 | Japan . |
| 52-92936 | 1/1981 | Japan . |
| 63-331323 | 12/1988 | Japan . |

*Primary Examiner*—Martin Lerner
*Attorney, Agent, or Firm*—Fitzpatrick, Cella, Harper & Scinto

[57] ABSTRACT

A photographing apparatus comprising an optical low-pass filter of phase grating type in which a plurality of prism portions, convex or concave in cross section, are arrayed in succession at a predetermined pitch, the arrangement being such that the aperture center or the optical axis of a photo taking lens is located substantially at an apex position of a concave or convex portion which is formed by a prism portion and its adjacent prism portion.

12 Claims, 23 Drawing Sheets

PHOTOGRAPHING APPARATUS HAVING OPTICAL LOW-PASS FILTER

This application is a continuation of prior application Ser. No. 07/858,605 filed on Mar. 27, 1992, now abandoned.

BACKGROUND OF THE INVENTION

1. Field of the Invention

The present invention relates to an optical low-pass filter which is disposed in front of a solid-state image sensor, and more particularly to an optical low-pass filter of phase grating type whereby excellent image output is obtained by suppressing the high spacial frequency component of an object producing a signal by virtue of this solid-state image sensor.

2. Related Background Art

It is well known that a color solid-state image sensor having a predetermined sampling pitch produces a spurious signal for an object having a high spacial frequency above a predetermined level. To suppress this spurious signal, it is common practice to provide an optical low-pass filter composed of crystal plate or an optical low-pass filter of phase grating type in front of the solid-state image sensor.

The crystal optical filter has a problem in that, although it can provide relatively ideal low-pass characteristics, the fabrication is difficult and the cost is high.

On the other hand, the optical low-pass filter of phase grating type has an advantage in that it can be fabricated at relatively low cost, although it is inferior with respect to the optical characteristics. It has been used in several video cameras, as proposed in, for example, Japanese Patent Application Laid-open No. 63-311323, Japanese Patent Publication No. 52-22247 and Japanese Patent Publication No. 56-2936.

By the way, the optical low-pass filter of phase grating type has a property that the low-pass effect abruptly decreases in a small aperture state, particularly if the aperture reaches within two periods of phase grating, as pointed out in Japanese Patent Publication No. 52-22247, for example.

This is because the optical low-pass filter of phase grating type obtains the low-pass effect by causing diffraction with a plurality of gratings, and the desired diffraction effect is reduced in such a small aperture state.

Therefore, in a video camera using the optical low-pass filter of phase grating type, a plurality of ND filters have been affixed to a portion of the aperture, or the density of ND filter has been increased, for example, so that the least aperture state may not be less than two periods, thereby bringing about high cost and the decreased quality of unfocused state.

SUMMARY OF THE INVENTION

In the light of the above-mentioned problems, it is an object of the present invention to provide an optical low-pass filter of phase grating type so that the low-pass effect does not decrease greatly even if the aperture is less than two periods of a phase grating.

The present invention is characterized by a photographing optical system comprising an optical low-pass filter of phase grating type in which a plurality of prism portions, convex or concave in cross section, are arrayed in succession at a predetermined pitch, the arrangement being such that the aperture center is located substantially at a concave or convex portion which is formed by a prism portion and its adjacent prism portion.

DESCRIPTION OF THE PREFERRED EMBODIMENTS

Figure 1:
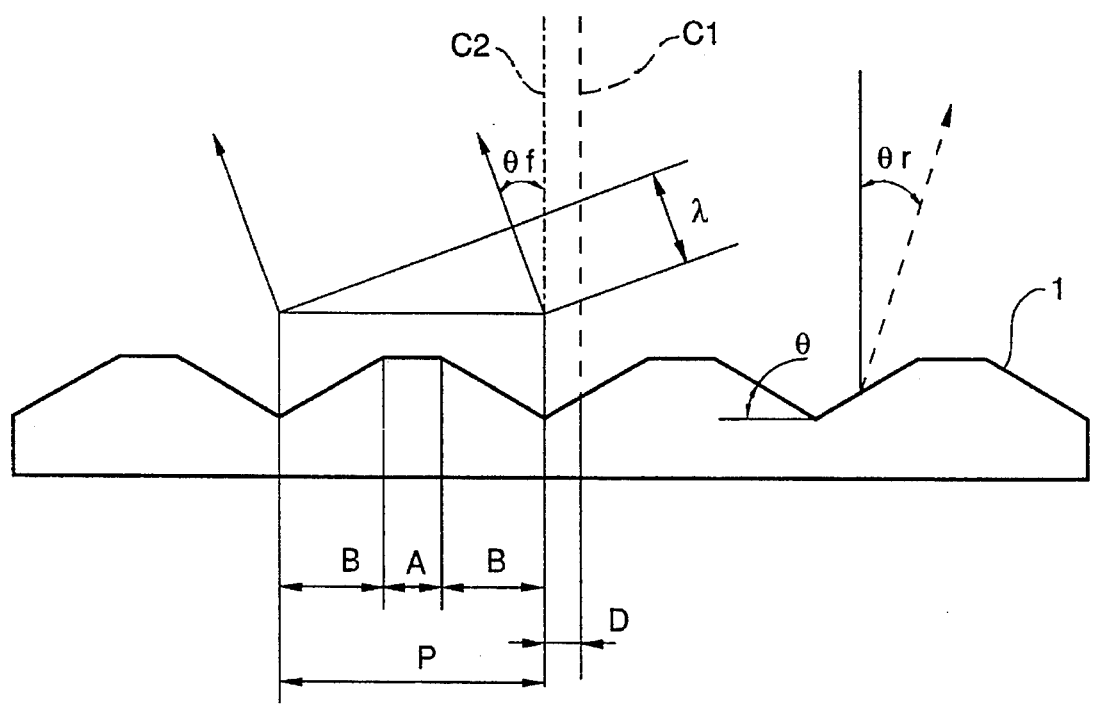
FIG. 1 is a view illustrating the cross section and the optical path of an optical low-pass filter according to the present invention.
Figure 2A:
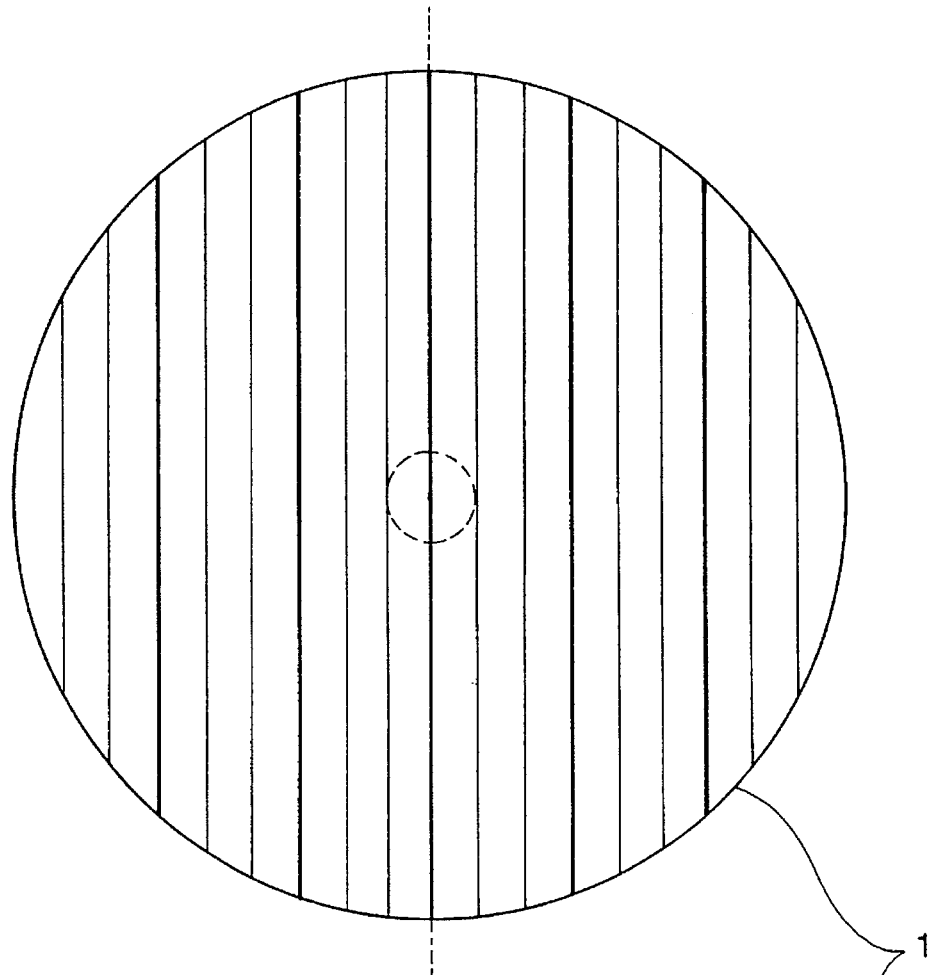
FIGS. 2A and 2B are an elevational view and a cross-sectional view of the optical low-pass filter according to the present invention.
Figure 2B:
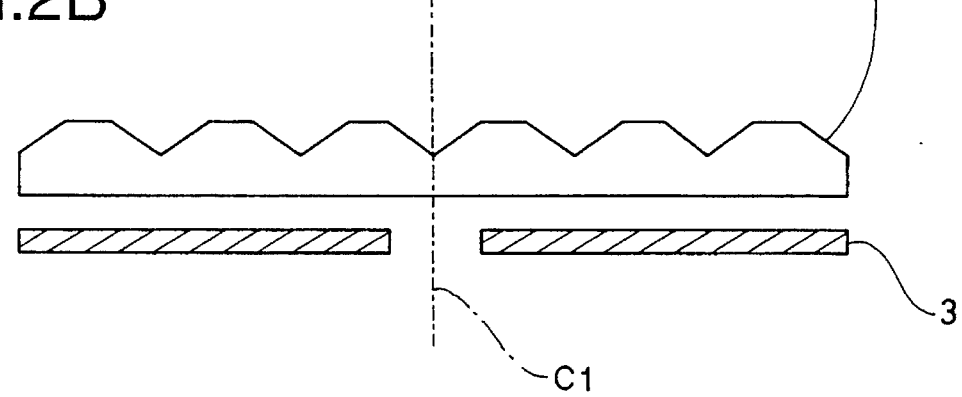

FIG. 1 is a cross-sectional view of an optical low-pass filter of phase grating type according to the present invention, and a view illustrating the optical path. FIG. 2A is an elevational view of the optical low-pass filter, and FIG. 2B is a cross-sectional view of the optical low-pass filter.

As shown, the optical low-pass filter 1 of this example forms a phase grating in which a plurality of prism bodies trapezoidal in cross section are arrayed in succession at a pitch P. An aperture center C1 (an optical axis of taking lens) of adjacent aperture 3 is arranged to be located at a concave region formed by two specific adjacent prism bodies.

In this way, in a state where the aperture 3 has a small F number (large aperture), it is possible to obtain a desired low-pass effect due to the diffraction caused by the wave optical phenomenon between phase gratings; while if the aperture is made smaller, the low-pass effect due to the diffraction is reduced, but instead the geometrical optical refraction effect owing to adjacent concave portions as above mentioned is dominant, so that it is possible to retain a desired low-pass effect by dividing a point image into two parts.

Here, as shown in FIG. 1, assuming that the planar width of a crest portion of a trapezoid is A, the width of a slope portion is B, the period is P, the first order diffraction angle of the phase grating is $\theta_f$, the refraction angle at the slope portion is $\theta_r$, the refractive index of the phase grating is n, the design wavelength is $\lambda$ (for example, e line), and the angle made by the slope portion of phase grating to the plane portion thereof is $\theta$, the first order diffraction angle $\theta_f$ and the refraction angle $\theta_r$ are written as, respectively, $$\theta_f = \sin^{-1}(\lambda/P)$$

$$\theta_r = (n-1)\theta$$

In order to give an excellent low-pass effect even at a smaller aperture, assuming that the drift amount between the aperture center C1 and an adjacent portion (apex C2 of trough) formed by the adjacent trapezoidal gratings is D, it is desirable that the following conditional inequality is satisfied, $$|D|/B < 0.33 \qquad (1)$$

To be further desirable, the following conditions should stand, $$0.15 < A/P < 0.35 \qquad (2)$$

$$0.5 < \theta_f/\theta_r < 1.4 \qquad (3)$$

Figure 4:
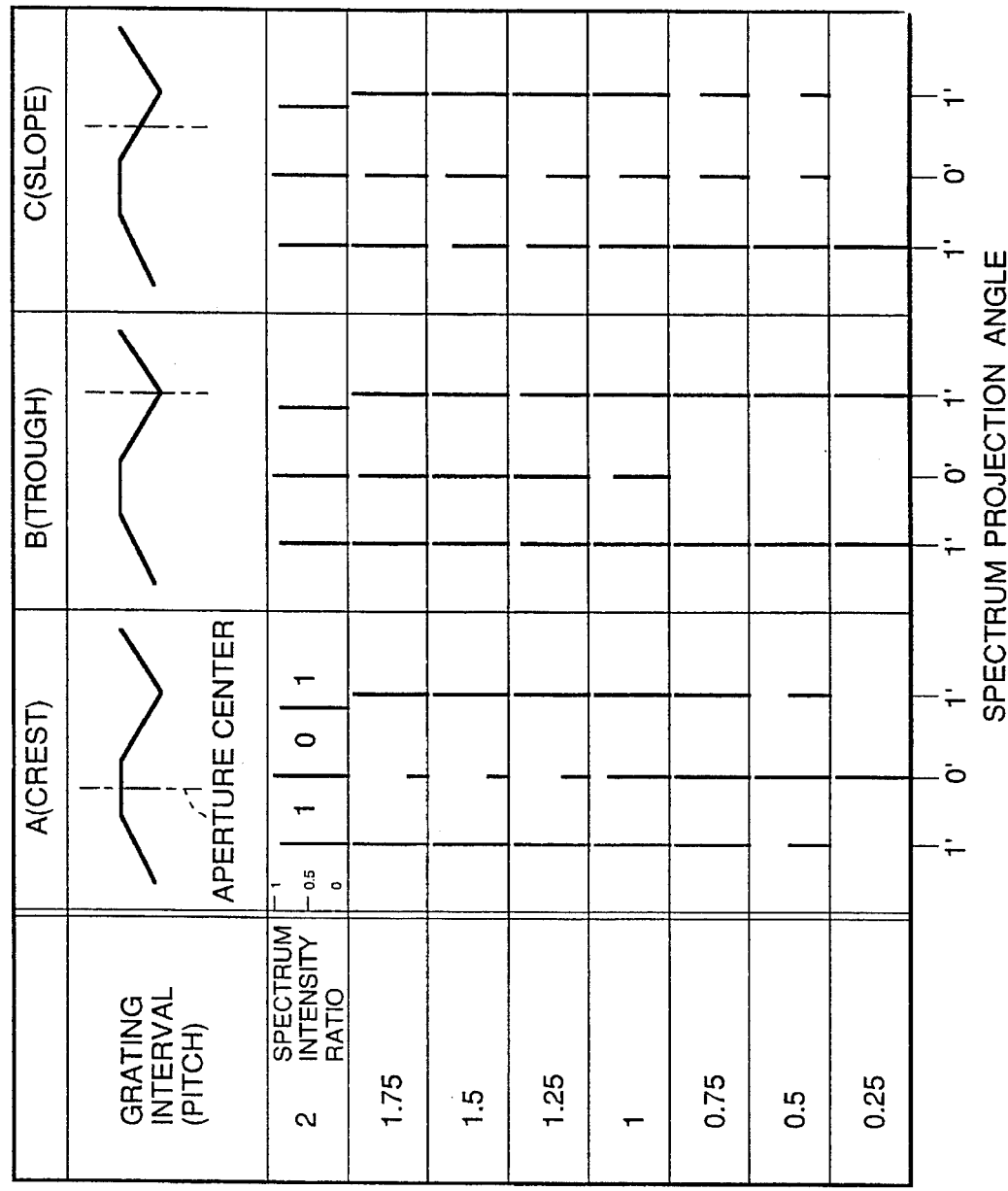
FIG. 4 is a view illustrating the spectrum intensity when the aperture center is changed.

The conditional inequality (1) is to define the drift amount D between the adjacent portion C2 of the trapezoid of phase grating and the aperture center C1, in which when the aperture center C1 is located outside the range of the conditional inequality, for example, at A (crest) or C (slope) as shown in FIG. 4, the light only passes through the plane portion A and the slope portion B particularly if the aperture is made smaller to 0.5 periods or less of the phase grating, resulting in almost no prism effect within the aperture, whereby among the zeroth order spectrum and two lines of the first order spectrum, only one line of the spectrum is larger in the intensity, so that the low-pass effect greatly decreases.

On the contrary, when the aperture center C1 is located at B (trough) of FIG. 4 according to the present invention which lies within the conditional inequality (1), the low-pass effect does not decrease in all cases where the aperture is less than two periods.

The conditional inequality (2) is to limit the ratio of the width A of the plane portion of the trapezoid to the period P of phase grating, in which the area of the plane portion is quite reduced in a region below that expressed by the conditional inequality, with the spectrum characteristics being closer to those of triangular phase grating, resulting in an undesirable low-pass effect which is greatly changed with the change of wavelength, and which decreases at wavelengths other than a specific wavelength. Also, in a region beyond that as expressed by the conditional inequality, the area of the plane portion is increased, whereby the zeroth order light spectrum is much larger than the first order light spectrum if the aperture is made smaller than two periods of phase grating, so that the low-pass effect undesirably decreases.

The conditional inequality (3) is to limit the ratio of the diffraction angle $\theta_f$ of phase grating to the refraction angle $\theta_r$ of the slope portion, in which supposing that the wave optics is predominant in the area of two periods or more of phase grating, while the geometrical optics predominates in the area less than two periods, the refraction angle $\theta_r$ of the slope portion is smaller than the diffraction angle $\theta_f$ in the region below that as expressed by the conditional inequality, whereby the projection angle of the first order spectrum is greatly smaller than the first order diffraction angle $\theta_f$ when the aperture is made smaller than two periods, so that the low-pass effect undesirably decreases. Also, in the region beyond that as expressed by the conditional inequality, the refraction angle $\theta_r$ of the slope portion is larger than the diffraction angle $\theta_f$, whereby the projection angle of the second order spectrum is larger than the first order diffraction angle $\theta_f$ when the aperture is made smaller than two periods, undesirably resulting in decreased resolution.

Figure 3:
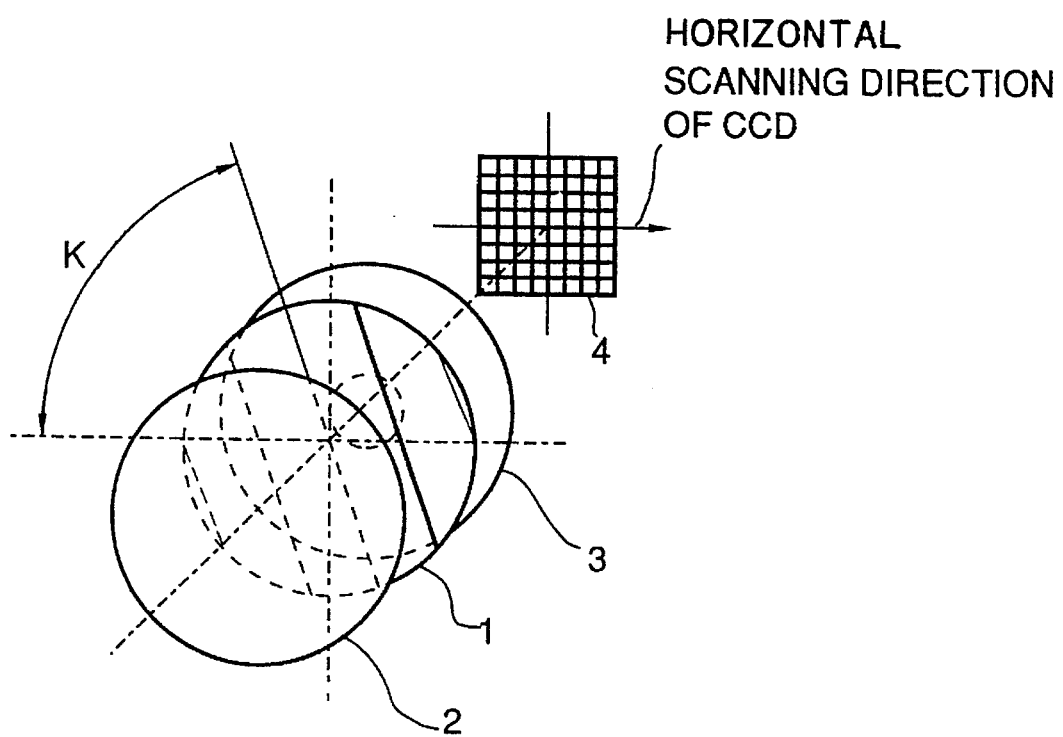
FIG. 3 is a perspective view of a video camera using an optical low-pass filter according to the present invention.

FIG. 3 illustrates a perspective view of an optical member arrangement for a video camera, in which 1 is an optical low-pass filter as previously described, 2 is a taking lens, 3 is an aperture, and 4 is a CCD which is a solid state image sensor.

In this example, to give the low-pass effect in the horizontal scanning direction of CCD 4 and the vertical direction to this horizontal scanning direction, the optical low-pass filter is inclined so that the longitudinal direction of grating (vertical to an array direction) for the optical low-pass filter has a predetermined angle with respect to the horizontal scanning direction. And to give the low-pass effect in the horizontal scanning direction and the vertical direction, the angle K is desirably set to satisfy the condition, $$45° < K < 70° \qquad (4)$$

In the region below that as expressed by the conditional inequality, there is undesirably a greatly decreased resolution in the vertical direction, while in the region beyond that as expressed by the conditional inequality, there is undesirably almost no low-pass effect in the vertical direction.

A numerical example of the optical low-pass filter according to the present invention is shown below.

Figure 5:
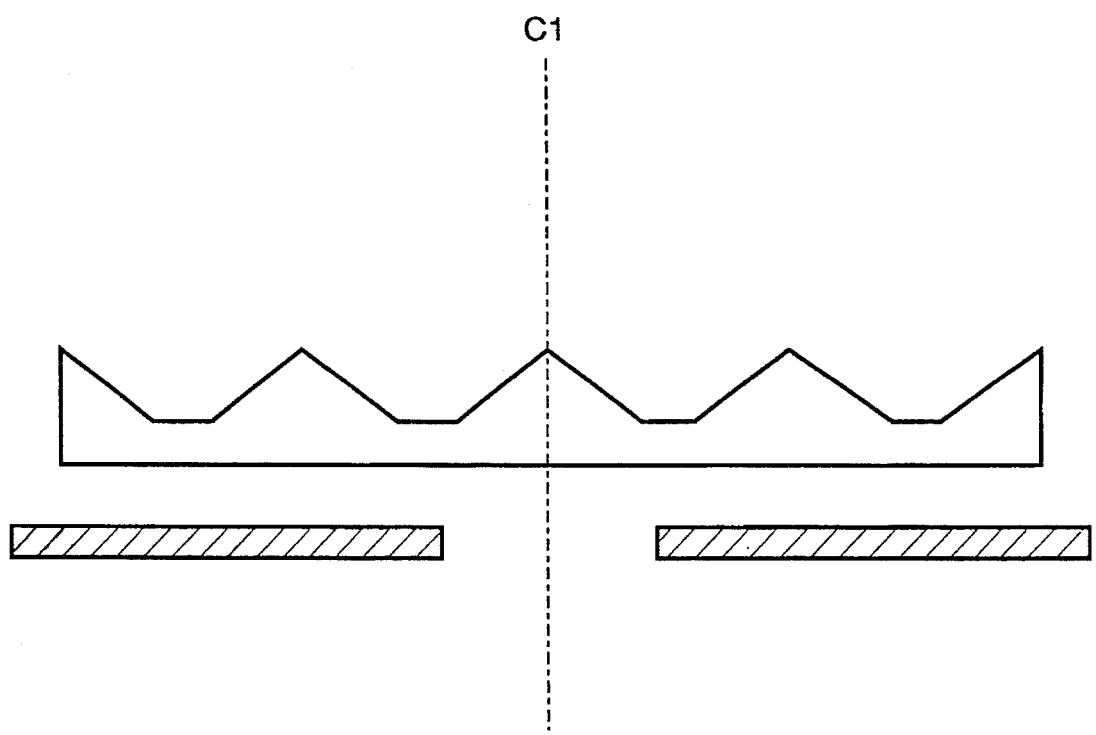
FIG. 5 is a cross-sectional view of another optical low-pass filter according to the present invention.

In this example, each grating element of trapezoidal shape is convex, but it should be noted that even if it has a reversed shape of grating of FIG. 1 (the convex portion has a triangular shape in cross section) as shown in FIG. 5, the effect for the optical low-pass filter may be exactly the same as that for the filter of FIG. 1. In this case, the objects of the present invention can be accomplished by arranging the grating in such a manner that the aperture center (optical axis) C1 is coincident with the apex of the convex shape.

| Numerical example 1 | Numerical example 2 | Numerical example 3 |
|---|---|---|
| P = 1.88 | P = 1.88 | P = 1.88 |
| A = 0.47 | A = 0.376 | A = 0.564 |
| B = 0.705 | B = 0.752 | B = 0.658 |
| θ = 0.0378 | θ = 0.0350 | θ = 0.040 |
| n = 1.49 | n = 1.49 | n = 1.49 |
| λ = 0.00055 | λ = 0.00055 | λ = 0.00055 |
| D = 0 | D = 0.1 | D = 0.15 |
| K = 60° | K = 60° | |
| Values of conditional inequality | | |
| A/P = 0.25 | A/P = 0.2 | A/P = 0.3 |
| $θ_r/θ_f$ = 1.1 | $θ_r/θ_f$ = 1.04 | $θ_r/θ_f$ = 1.19 |
| |D|/B = 0 | |D|/B = 0.133 | |D|/B = 0.23 |

A new photographing apparatus according to the present invention will be described below wherein an excellent low-pass effect can be obtained with the improvement of the optical low-pass filter.

Figure 6A:
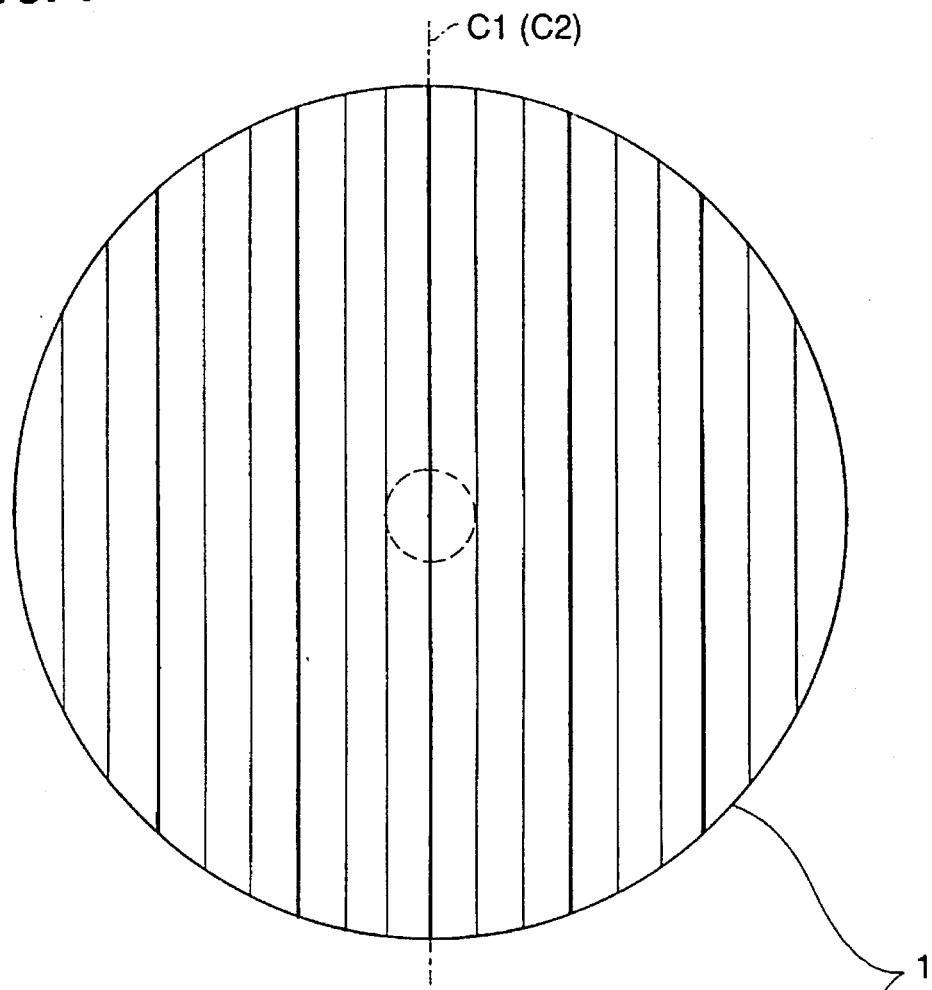
FIGS. 6A and 6B are an elevational view and a cross-sectional view of another optical low-pass filter according to the present invention.
Figure 6B:
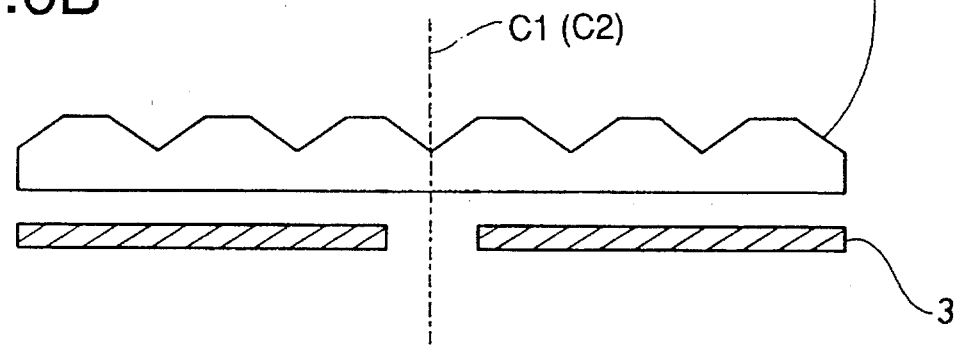
Figure 7:
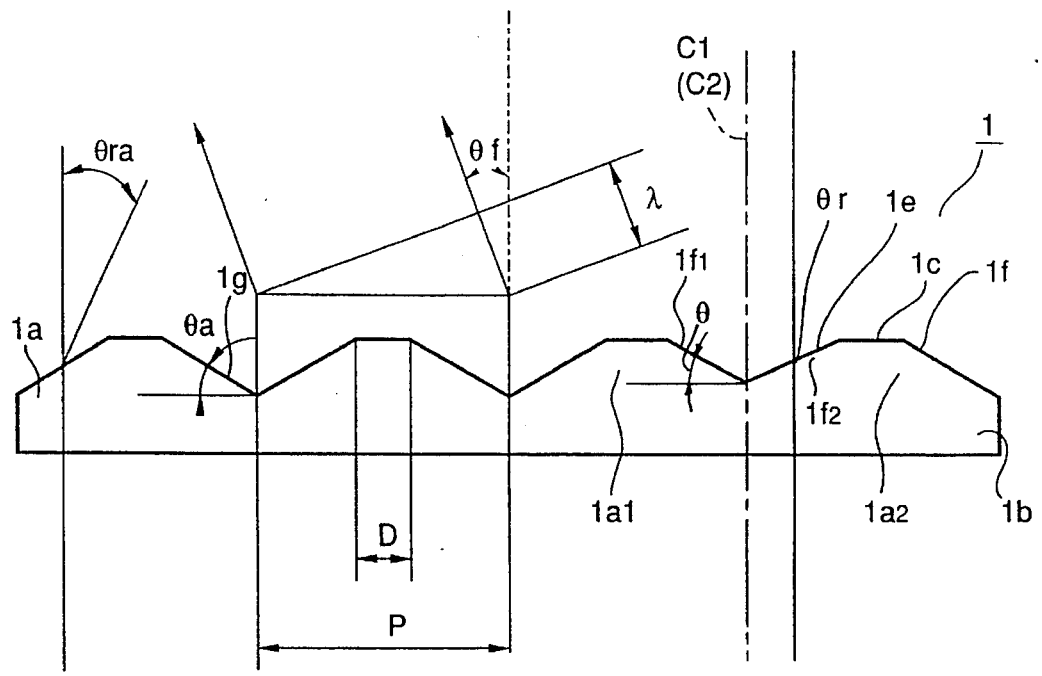
FIG. 7 is a schematic cross-sectional view of a portion of FIG. 6.
Figure 8:
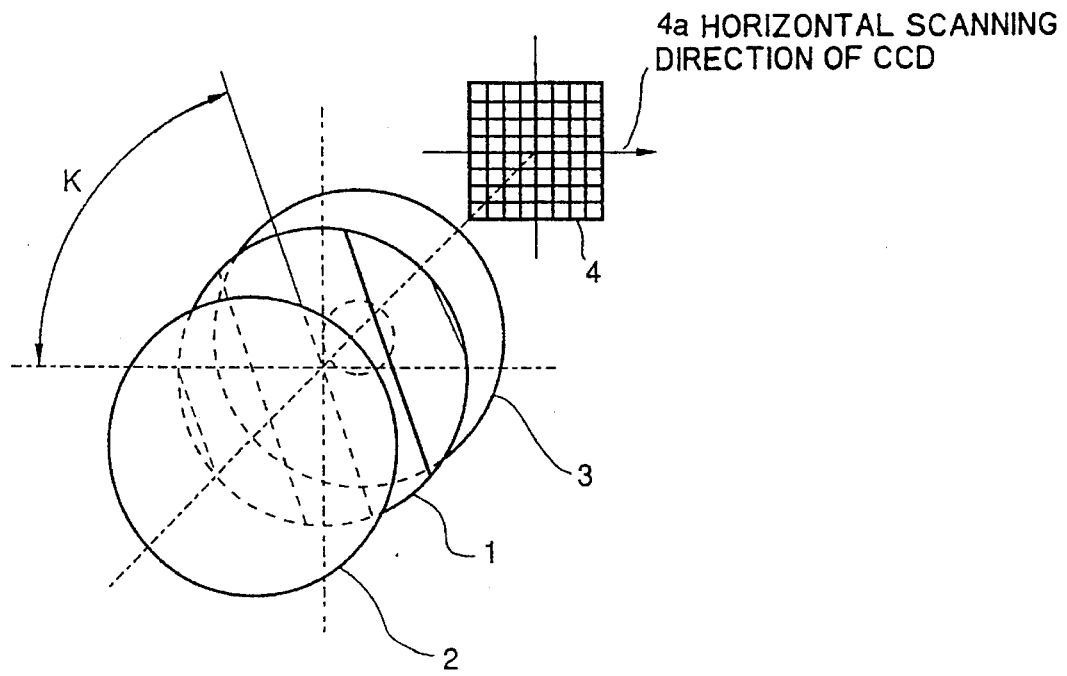
FIG. 8 is a schematic view of an essential part of a photographing system having an optical low-pass filter according to the present invention.

FIGS. 6A and 6B are an elevational view and a cross-sectional view of an optical low-pass filter in example 2 according to the present invention. FIG. 7 is a schematic cross-sectional view of the optical low-pass filter of the present invention, and FIG. 8 is a schematic view of an essential part of a photographing system having the optical low-pass filter of the present invention.

In the latter figure, 1 is an optical low-pass filter, composed of phase gratings, trapezoidal in cross section. 2 is a taking lens system composed of a plurality of lenses, and 3 is an aperture. The optical low-pass filter 1 is disposed in the vicinity of the aperture 3. 4 is a solid state image sensor composed of CCD.

The optical low-pass filter 1 is arranged such that its phase grating direction is inclined by an angle K with respect to the horizontal scanning direction 4a of the solid state image sensor 4.

The phase gratings constituting the optical low-pass filter are integrally formed and fabricated, its cross-sectional shape being such that the trapezoid portions 1a of trapezoidal shape are arrayed in succession at a pitch P in a one dimensional direction on a substrate 1b composed of parallel flat plates, as shown in FIG. 7. In the same figure, the trapezoid portion 1a has a crest flat portion 1c having the width D, C1 being a central line of the optical low-pass filter 1. C2 shows the aperture center of the taking lens 2 or the aperture 3.

1e is a central region where the phase gratings (trapezoid portions 1a) are arrayed, corresponding to a spacial region formed by the inclined planes 1f1 and 1f2 of two trapezoid portions 1a1 and 1a2, located left and right to the central line C1.

The angle θ made by the inclined plane 1f1 of the trapezoid portion 1a in the central region 1e to the substrate 1b is different from the angle $θ_a$ made by the inclined plane 1g in other regions to the substrate 1b.

In this example, the optical low-pass filter 1 is arranged in the photographing system so that the central line C1 is substantially coincident with the aperture center C2 of the aperture 3.

FIG. 7 shows an instance in which the optical low-pass filter 1 is arranged in the photographing system C2 so that the aperture center 2 of the aperture 3 is coincident with the central line C1 of the optical low-pass filter 1.

In this example, the angle made by the inclined planes 1f1, 1f2 of phase grating in the central region 1e to the substrate 1b is different from the angle made by the inclined plane 1g of phase grating in other regions to the substrate 1b. Thereby, it is possible to obtain a constant low-pass effect even when the aperture diameter is made smaller than two periods of phase grating.

In particular, this example is different from the first example as previously described, in that the shape of the optical low-pass filter is specified such that the angle made by the inclined planes 1f1, 1f2 of phase grating in the central region 1e to the substrate 1b is smaller than the angle made by the inclined plane of phase grating in other regions to the substrate 1b. Thus, by specifying the attitude in disposing it in the photographing system, it is possible to readily obtain a predetermined low-pass effect in such a manner as to reduce the aperture 3 for an object of high brightness, and for example, to effectively refract the passing light flux even at less than two periods of phase grating, so as to prevent the optical performance from decreasing.

Moreover, in the present invention, in order to obtain an excellent low-pass effect by disposing the optical low-pass filter in the photographing system while preventing optical performance from decreasing, the following conditions should be satisfied:

(i) Assuming that among the light flux incident at a right angle upon the substrate of the optical low-pass filter, the refraction angle of the light flux passing through the inclined plane of phase grating adjacent the central region is $θ_r$, the first order diffraction angle of the phase grating is $θ_f$, the angle made by the inclined plane of the phase grating to the substrate is θ, the refractive index of the material of the phase grating is n, and the use wavelength is λ (e.g., e line), the condition $$0.4 < θ_r/θ_f < 1.1 \qquad (4)$$

must be satisfied, where $$θ_r = (n-1)θ$$

$$θ_f = \sin^{-1}(λ/P)$$

If a lower limit of the conditional inequality (4) is exceeded, the projection angle $θ_r$ is greatly smaller than the first order diffraction angle $θ_f$ of phase grating, because the projection angle $θ_r$ can be determined based on the principle of geometrical optics if the aperture is made smaller than, for example, two periods of phase grating, so that the low-pass effect undesirably decreases.

If an upper limit of the conditional inequality (4) is exceeded, the projection angle of the first order diffracted light is conversely larger than the first order diffraction angle $θ_f$ of phase grating, undesirably resulting in greatly decreased resolution of the photographing system.

(ii) Assuming that the refraction angle of the light flux passing through the inclined plane of phase grating except the central region among the light flux incident at a right angle upon the substrate of the optical low-pass filter is $θ_{ra}$, the width of the crest flat portion of the phase grating is D, and the first order diffraction angle of the phase grating is $θ_f$, the following conditional inequalities must be satisfied, $$0.15 < D/P < 0.35 \qquad (5)$$

$$1.1 < θ_{ra}/θ_f < 1.6 \qquad (6)$$

Figure 10:
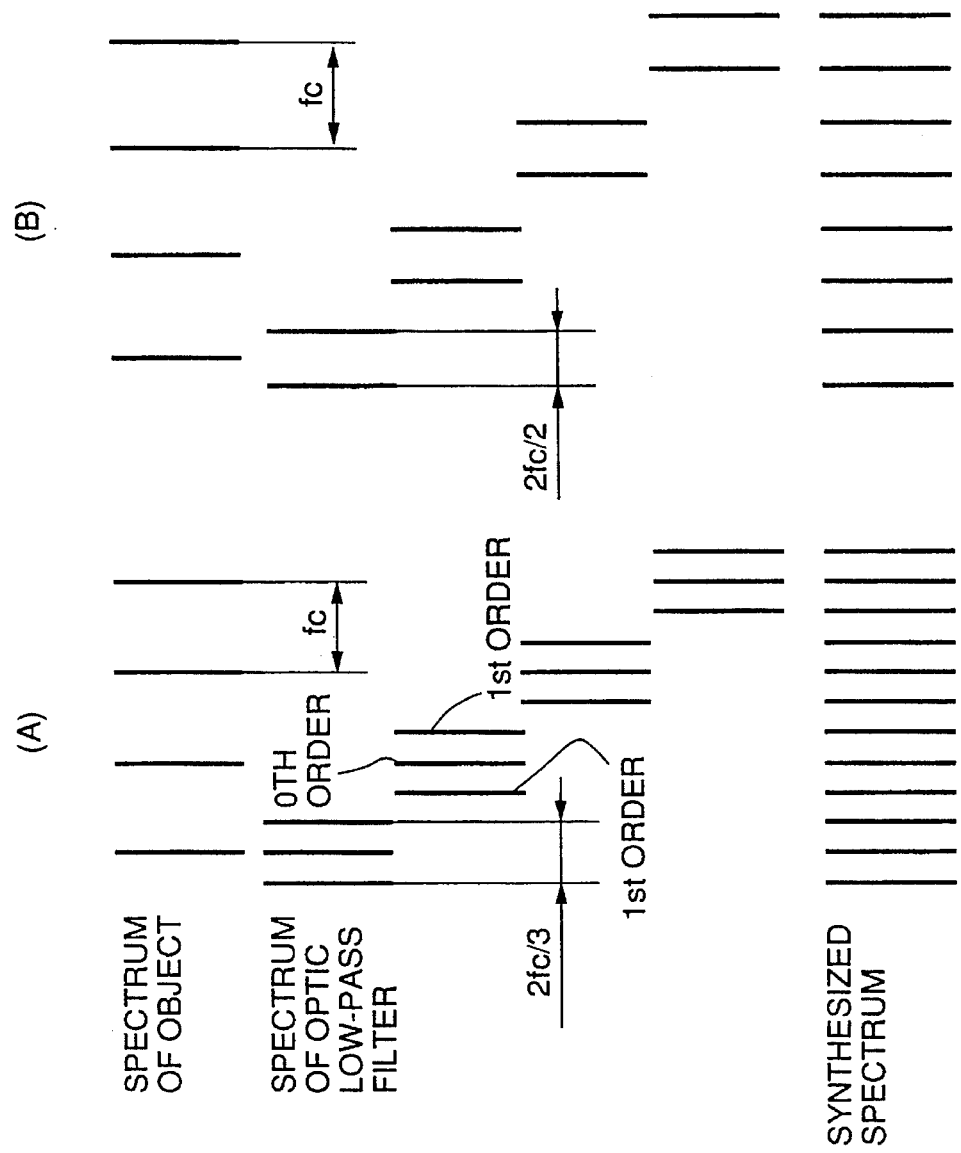
FIG. 10 is an explanation view of the spectrum of optical low-pass filter.

Referring now to FIG. 10 illustrating the spectrum intensity of the optical low-pass filter, the conditional inequalities (5) and (6) will be described below. Note that in the same figure $f_c$ indicates the cut-off frequency due to the low-pass effect.

The conditional inequalities (5) and (6) are concerned with the shape and characteristics of phase grating except for the central region, and define the conditions where the spectrum intensities for the zeroth order light and the first order diffracted light are substantially equal at a wavelength $\lambda$ of interest, as shown in FIG. 10(A), mainly based on the principle of wave optics.

Here, by making substantially equal the spectrum intensities for the zeroth order light and the first order diffracted light, the period of phase grating is reduced as compared with a case as shown in FIG. 10(B) where there is only the first order diffracted light, with almost no intensity of the zeroth order light, to obtain the same low-pass effect. Thereby, even with a small aperture of two periods or less of phase grating, it is possible to obtain a constant low-pass effect.

Here, supposing that the arbitrary cut-off frequency is $f_c$, the comparison is made between three spectra of equal intensity as shown in FIG. 10(A) and two spectra of equal intensity as shown in FIG. 10(B). If the interval between both spectrum ends (first order to first order spectrum interval) for two spectra is $f_c/2$, and the interval between both spectrum ends (first order to first order spectrum interval) for three spectra is $2f_c/3$, it is possible to make MTF zero at the cut-off frequency $f_c$. That is, the period of phase grating can be reduced by 25% if three spectra are made equal.

The conditional inequalities (5), (6) have been set in view of the above-mentioned respects. Below the lower limit of the conditional inequality (5), the width D of the crest flat portion is too narrow, while the width of inclined plane is wider, whereby the first order diffracted light is larger in spectrum than the zeroth order light, undesirably resulting in decreased resolution of the photographing system. Also, if the width D of the crest flat portion is too narrow, the spectrum characteristics are closer to those of triangular phase grating, so that the low-pass effect is undesirably greatly changed with the change of wavelength.

If the width D of the crest flat portion is too wide, beyond the upper limit of the conditional inequality (5), the spectrum intensity of the zeroth order light is larger than that of the first order diffracted light, undesirably resulting in decreased low-pass effect. Also, the area ratio of the crest flat portion within the aperture is too larger, when the aperture is made smaller than two periods of phase grating, so that the low-pass effect undesirably decreases.

If the refraction angle $\theta_{ra}$ is too much smaller than the first order diffraction angle $\theta_f$, below the lower limit of the conditional inequality (6), the intensity of the first order diffracted light is too much weaker than that of the zeroth order light, undesirably resulting in decreased low-pass effect.

If the refraction angle $\theta_{ra}$ is too much larger than the first order diffraction angle $\theta_f$, beyond the upper limit of the conditional inequality (6), the intensity of the first order diffracted light is much stronger than that of the zeroth order light, undesirably resulting in decreased resolution of the photographing system.

(iii) The photographing system has a solid state image sensor, and assuming that the angle made by the phase grating direction to the horizontal scanning direction of the solid state image sensor is K, the optical low-pass filter must be arranged to satisfy the following condition, $$45° < K < 75°$$

If the angle K is too small below a lower limit of this conditional inequality, the resolution of the photographing system in the vertical direction will undesirably greatly decrease. Also, beyond an upper limit thereof, the resolution increases, but the low-pass effect in the vertical scanning direction undesirably diminishes.

Figure 11:
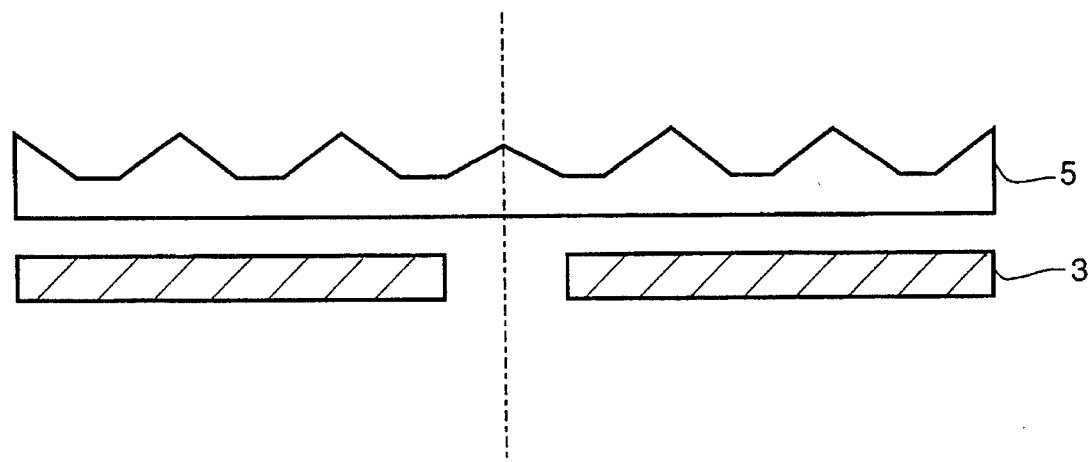
FIG. 11 is a cross-sectional view of an essential part of an optical low-pass filter according to the present invention.

FIG. 11 is a cross-sectional view of an essential part of an optical low-pass filter in example 3 according to the present invention. In this example, the concave/convex shape of trapezoid portion 1a of phase grating is reversed with respect to that as shown in FIG. 6B.

In this example, it is also possible to obtain the same effects as in example 2 by satisfying the conditional inequalities as previously described, with an exactly reversed shape of phase grating.

Figure 9:
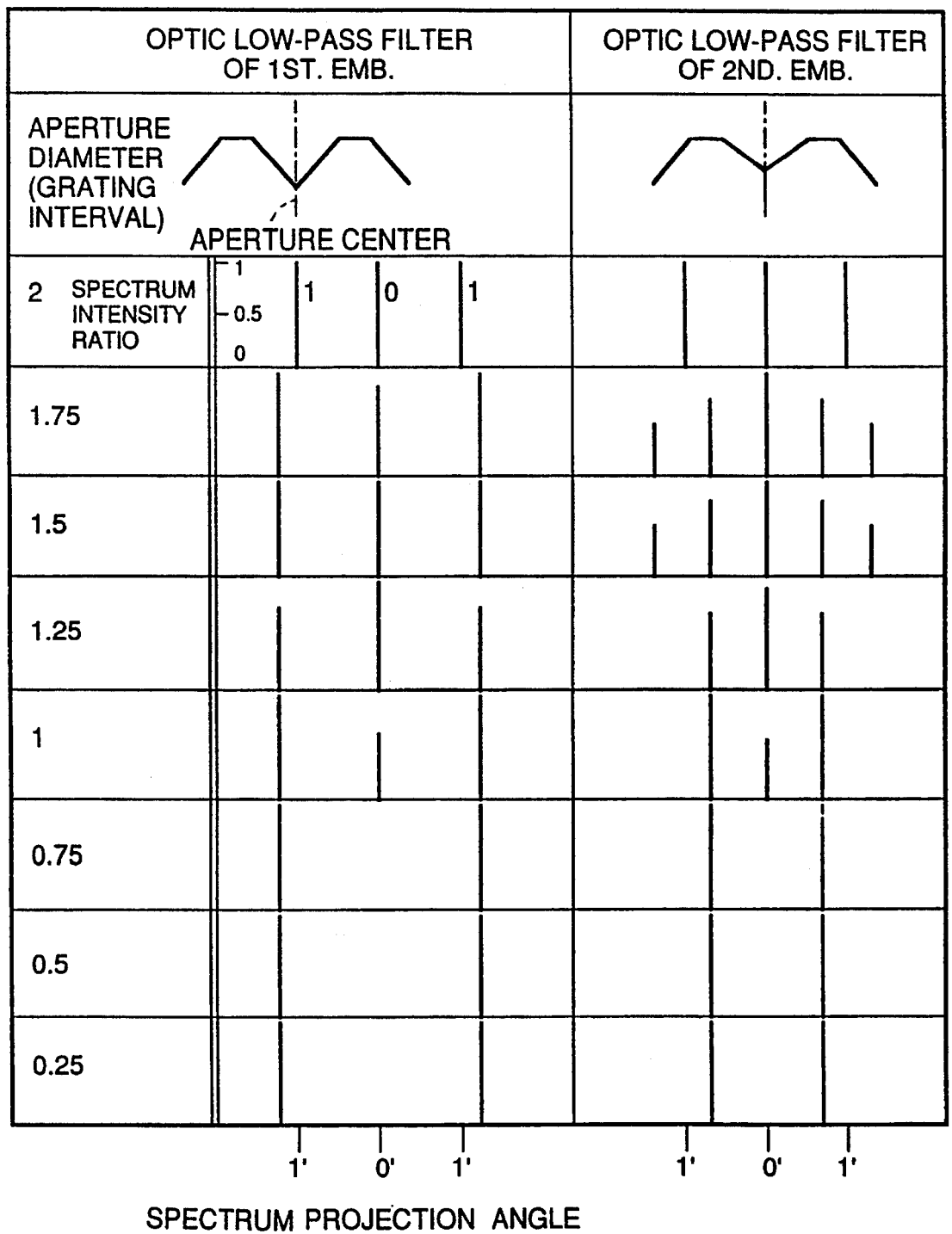
FIG. 9 is a comparison view showing the spectrum intensity between an optical low-pass filter according to the present invention, and the optical low-pass filter of FIG. 1.

FIG. 9 is an explanation view showing the spectrum projection angle and the spectrum intensity when an optical low-pass filter of the present invention and the optical low-pass filter as previously described are used. In the same figure, the light flux enters with variously changed apertures from two periods of phase grating to 0.25 period.

If the aperture is reduced down to 0.75 period or less of phase grating in the optical low-pass filter as previously described, only the spectrum of the first order diffracted light exists, and the spectrum projection angle of the first order diffracted light is larger than that at two periods, resulting in greatly decreased resolution of the photographing system.

On the contrary, with the optical low-pass filter of the second example, the spectrum projection angle of the first order diffracted light is about 75% of that at two periods, even if the aperture is 0.75 period or less of phase grating, so that it is possible to obtain the same low-pass effects as at two periods even with the zeroth order light extinguished.

Next, the relation between specific numerical example of the optical low-pass filter according to the present invention, the numerical example of the conventional optical low-pass filter as previously described, and each conditional expression will be shown below.

|  | Numerical example 4 | Numerical example 5 | Numerical example 6 |
| --- | --- | --- | --- |
| P | 1.88 | 1.88 | 1.88 |
| A | 0.47 | 0.376 | 0.564 |
| θ | 0.0255° | 0.0170° | 0.0340° |
| n | 1.49 | 1.49 | 1.49 |
| λ | 0.00055 | 0.00055 | 0.00055 |
| $\theta_a$ | 0.0463° | 0.0463° | 0.0463° |
| K | 60° | 65° | 55° |
| $\theta_r/\theta_f$ | 0.745 | 0.497 | 0.994 |
| D/P | 0.25 | 0.2 | 0.3 |
| $\theta_{ra}/\theta_f$ | 1.35 | 1.35 | 1.35 |
| K | 60 | 65° | 55° |

An example of a further improved optical low-pass filter according to the present invention will be described below.

The optical low-pass filter of the present invention as disclosed below is one in which phase gratings, of trapezoidal shape in cross section, are arrayed in succession or with bottom flat portion having a predetermined width interposed at a pitch P in a one dimensional direction, and assuming that the width of the bottom flat portion at the central portion of the optical low-pass filter is A1, it is characterized by satisfying the conditional inequality $$A1/P<0.15 \tag{7}$$

The photographing system having the optical low-pass filter of the present invention is characterized in that when the optical low-pass filter, in which phase gratings trapezoidal in cross section are arrayed in succession or with bottom flat portion having a predetermined width interposed at a pitch P in a one dimensional direction, is provided on a portion of the photographing system, the central region composed of a boundary portion or bottom flat portion of phase grating in the central portion of the optical low-pass filter is located substantially at the aperture center or the optical axis of the taking lens, and assuming that the width of the bottom flat portion in the central region is A, the conditional inequality is satisfied, $$A/P<0.15 \tag{8}$$

Figure 12A:
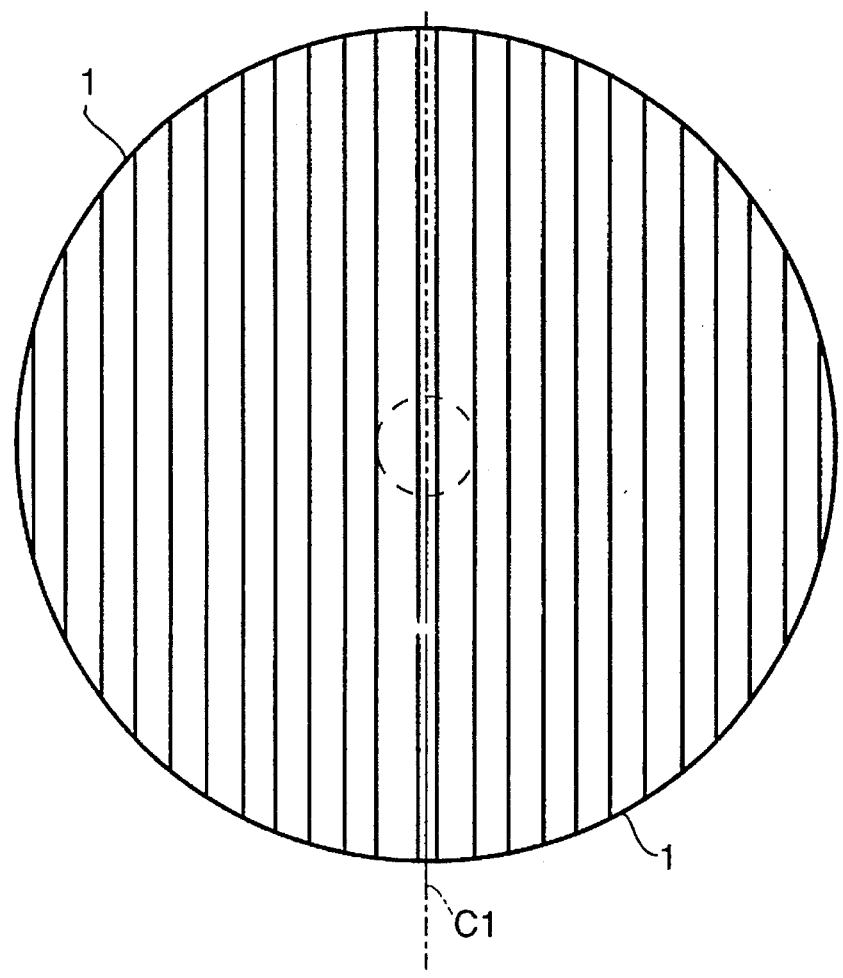
FIGS. 12A and 12B are an elevational view and a a side view of another optical low-pass filter according to the present invention.
Figure 12B:
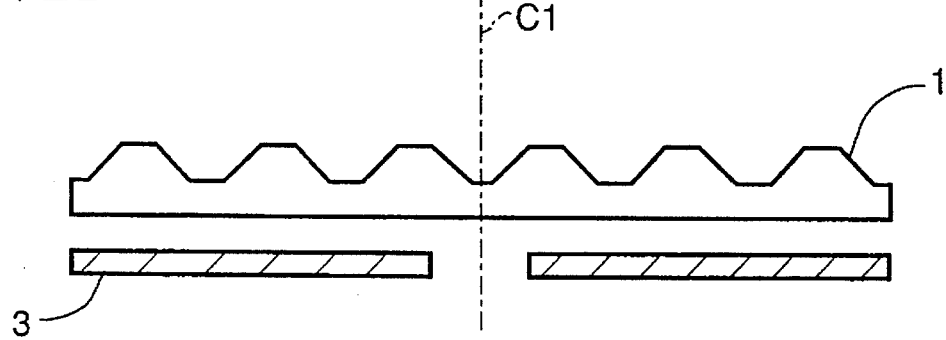
Figure 13:
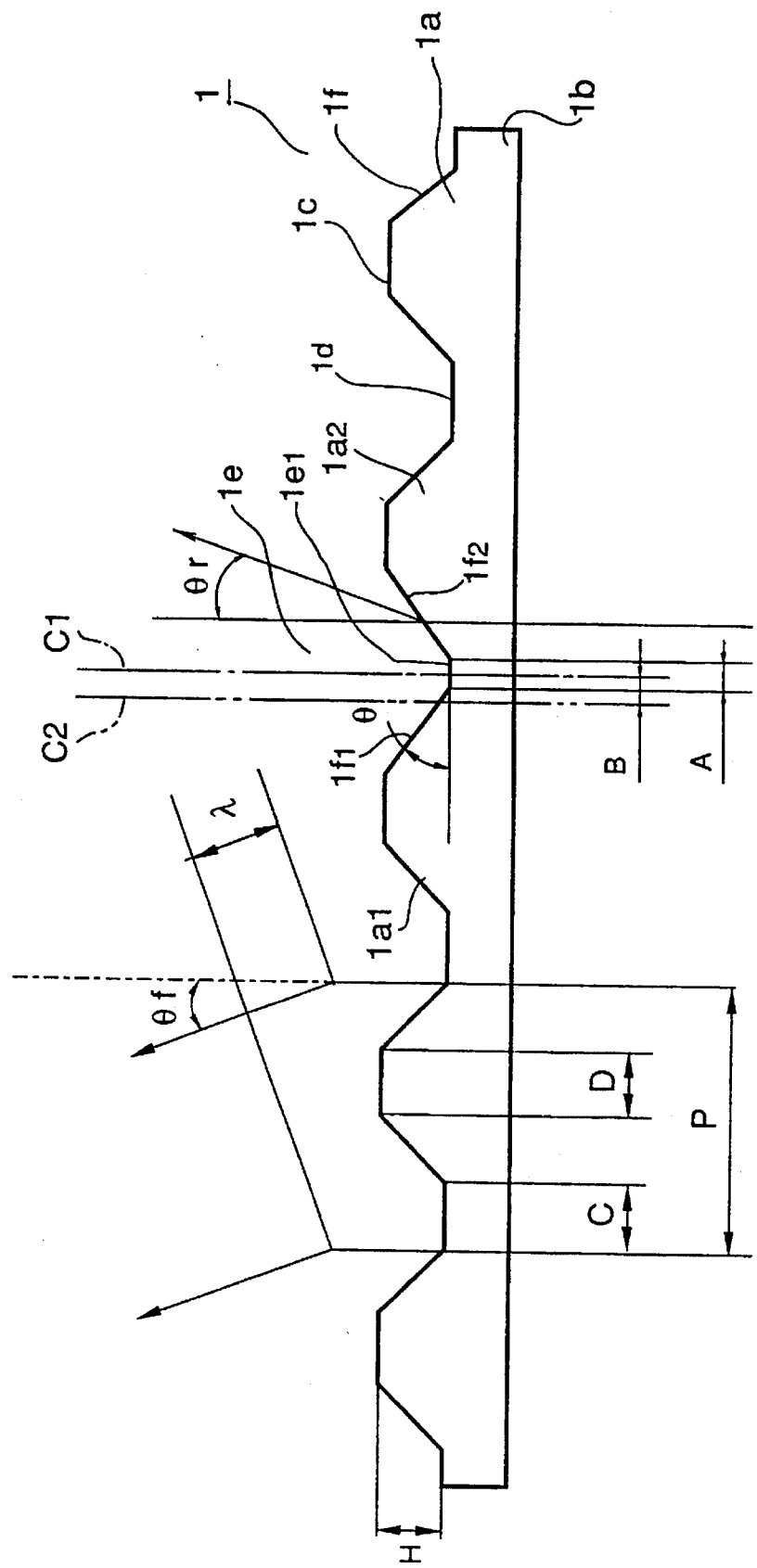
FIG. 13 is a schematic cross-sectional view of a portion of FIG. 12.

FIGS. 12A and 12B are an elevational view and a cross-sectional view of an optical low-pass filter in another example of the present invention, and FIG. 13 is a schematic cross-sectional view of the optical low-pass filter according to the present invention.

The phase gratings constituting the optical low-pass filter are integrally formed, its cross-sectional shape being such that trapezoid portions 1a of trapezoidal shape are arrayed in succession or with bottom flat portion having a predetermined width interposed at a pitch P in one dimensional direction on a substrate 1b composed of parallel plates, as shown in FIG. 13. The succession as herein referred to means that the width of bottom flat portion 1d is zero.

In the same figure, the trapezoid portions 1a, comprising crest flat portions 1c having width D, are arrayed with the interposition of bottom flat portions 1d having different widths depending on the location.

C1 is a central line of the optical low-pass filter 1. C2 shows the aperture center of the photographing system 2.

The central portion of the optical low-pass filter 1 is located at a bottom flat portion 1d when the trapezoid portions 1a are arrayed. At this time, the central line C1 passes through the central portion of the bottom flat portion 1d. 1e is a central region in which the phase gratings (trapezoid portions 1a) are arrayed, corresponding to a spacial region formed by the inclined planes 1f1 and 1f2 of two trapezoid portions 1a1 and 1a2, located left and right to the central line C1.

The width A of the bottom flat portion 1e1 in the central region 1e is less than the width C of the bottom flat portion 1d. When the width A is zero, the bottom flat portion 1e1 does not exist (see FIG. 14 as thereinafter described), whereby two trapezoid portions 1a1, 1a2 in the central region 1e are arrayed continuously. In this case, only the boundary line exists in the central region 1e.

In this example, the optical low-pass filter is disposed in the photographing system such that its central line C1 is substantially coincident with the aperture center C2 of the aperture 3.

FIG. 13 shows an instance in which the optical low-pass filter 1 is disposed in the photographing system 2 such that the aperture center C2 of the aperture 3 is slightly deviated from the bottom flat portion 1e1 to pass through a portion of the inclined plane 1f1.

And the optical low-pass filter is arranged in the photographing system such that the boundary portion of the central region 1e is substantially coincident with the aperture center C2 of the aperture 3 when the width A of the bottom flat portion 1e1 is small or almost zero. The trapezoidal shape of trapezoid portion 1a, for example, the width of the bottom flat portion 1d, or the inclination angle θ of the inclined plane 1f to the substrate 1b, is different depending on the location.

In this example, by specifying the shape of optical low-pass filter and the attitude in disposing it in the photographing system, as above described, it is possible to readily obtain a predetermined low-pass effect in such a manner as to make smaller the aperture 3 for an object of high brightness, for example, effectively refracting the passing light flux even at less than two periods of phase grating, so as to prevent the optical performance from decreasing.

In particular, the present invention can provide an excellent low-pass effect by setting the ratio of the width A of the bottom flat portion 1d in the central region to the period P of phase grating so as to satisfy the conditional inequality (7) for the optical low-pass filter, and the conditional inequality (8) for the arrangement in the photographing system. If the conditional inequality (7) or (8) is not satisfied, the area ratio of the bottom flat portion within the aperture is much larger than that of the inclined plane, when the aperture is made smaller to less than two periods of phase grating, particular 0.5 periods or less, whereby the spectrum intensity of the zeroth order light is too strong, undesirably resulting in decreased low-pass effect.

Besides, in the present invention, in order to obtain an excellent low-pass effect by disposing the optical low-pass filter in the photographing system while preventing the optical performance from decreasing, the following conditions should be satisfied:

(i) Assuming that the deviation amount between the aperture center of the aperture and the center of the bottom flat portion in the central region of the optical low-pass filter is B, the optical low-pass filter must be set to satisfy the following conditional inequality, $$B/P<0.15 \tag{9}$$

If the conditional inequality (9) is not satisfied, the area ratio of the inclined plane or crest flat portion of phase grating is only larger, when the aperture is reduced down to 0.5 period or less, so that there is less prism action for separating the light flux, and the low-pass effect undesirably decreases.

(ii) Assuming that the refraction angle of the light flux passing through the inclined plane of phase grating adjacent the central region, among the light flux incident at a right angle upon the substrate of the optical low-pass filter, is $θ_r$, the first order diffraction angle of the phase grating is $θ_f$, the angle made by the inclined plane of the phase grating to the substrate is θ, the refractive index of the material of the phase grating is n, and the use wavelength is λ, the condition $$0.5<θ_r/θ_f<1.4 \tag{10}$$

must be satisfied, where $$θ_r=(n-1)θ$$

$$θ_f=\sin^{-1}(λ/P)$$

If a lower limit of the conditional inequality (10) is exceeded, it is possible to determine the projection angle $θ_r$ based on the principle of geometrical optics, when the aperture is reduced down to one period or less of phase grating, for example. Then the projection angle $θ_r$ is much smaller than the first order diffraction angle $θ_f$ of phase grating, undesirably resulting in decreased low-pass effect.

If an upper limit of the conditional inequality (10) is exceeded, the projection angle of the first order diffracted light is conversely larger than the first order diffraction angle $\theta_f$ of phase grating, undesirably resulting in greatly decreased resolution of the photographing system.

(iii) Assuming that the width of the bottom flat portion except the central region is C, the width of crest flat portion of the phase grating is D, and the height from the bottom flat portion to the crest flat portion is H, the following conditional inequalities must be satisfied, $$0.2 \leq C/P \leq 0.3 \quad 0.2 \leq D/P \leq 0.3 \quad 0.6 \leq H/\lambda < 1.2 \tag{11}$$

If the conditional inequalities are not satisfied, the low-pass effect is greatly changed with the change of wavelength, so that it is difficult to obtain the excellent optical low-pass filter effect over the entire visible area.

(iv) The photographing system has a solid state image sensor, and assuming that the angle made by the phase grating direction of the optical low-pass filter to the horizontal scanning direction of the solid state image sensor is K, the following condition shoud be satisfied, as previously described, $$45° < K < 75°$$

Figure 14A:
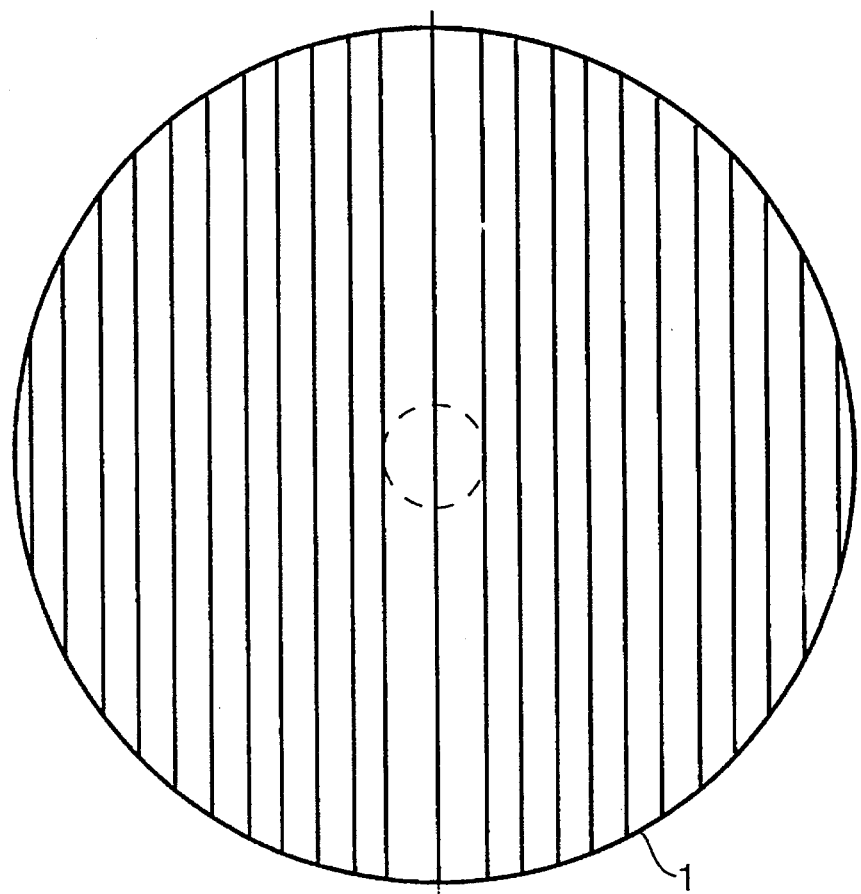
FIGS. 14A and 14B are an elevational view and a side view of another optical low-pass filter according to the present invention.
Figure 14B:
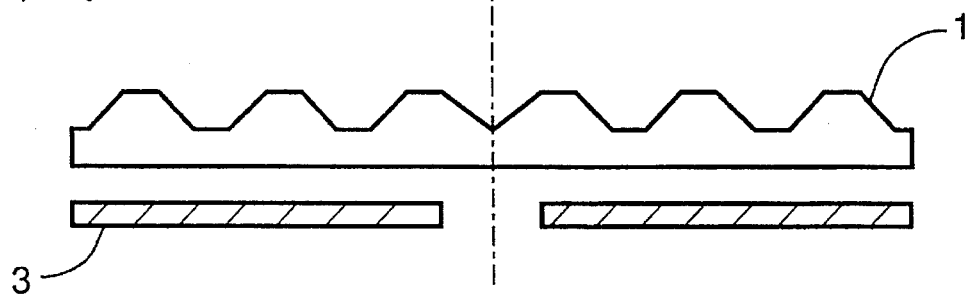
Figure 15:
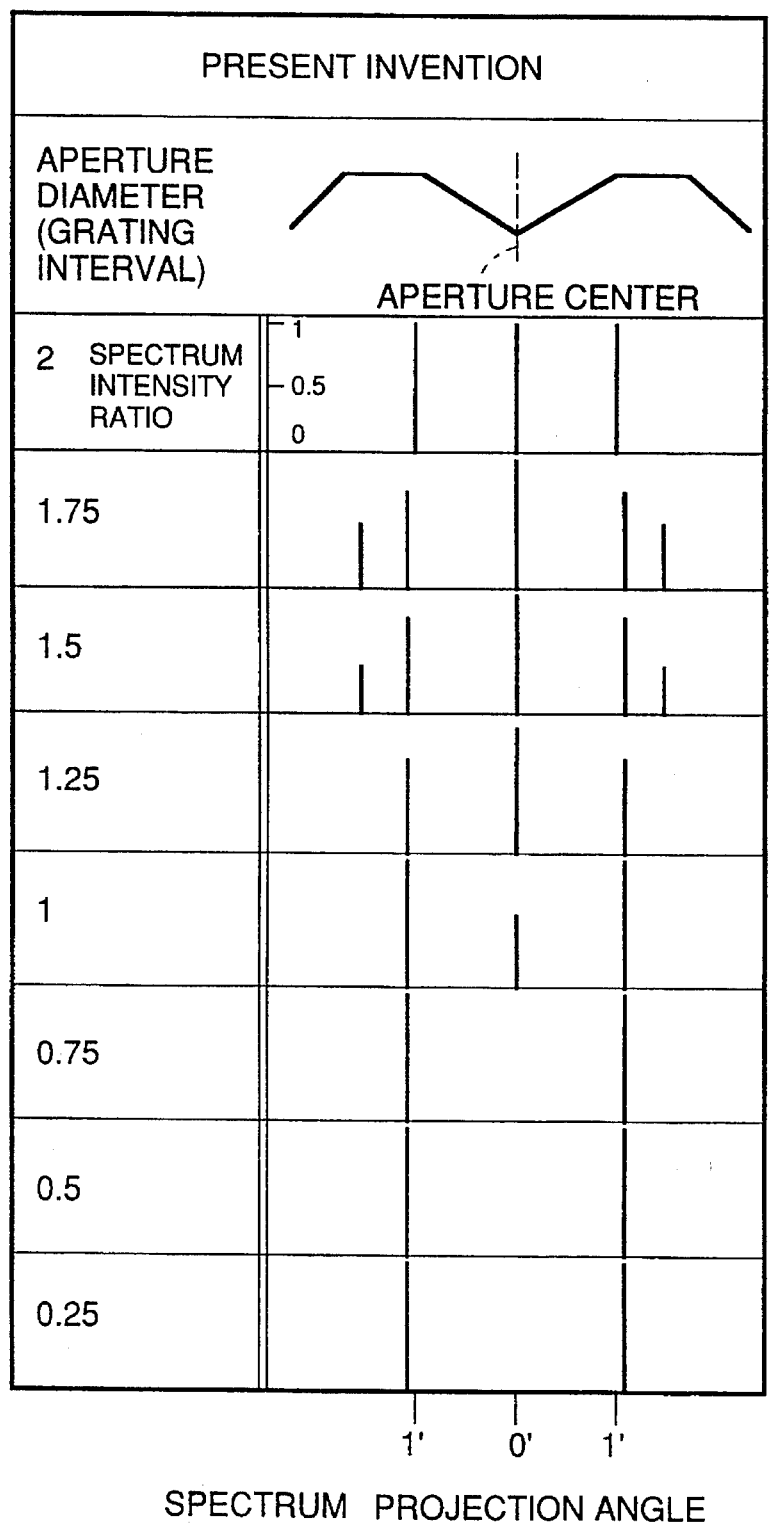
FIG. 15 is a comparison view showing the spectrum intensity of an optical low-pass filter according to the present invention.

FIGS. 14A and 14B are an elevation view and a cross-sectional view of an optical low-pass filter in another example according to the present invention. In this example, the trapezoid portions 1a of phase grating are arranged continuously, that is, the width of the bottom flat portion is zero.

In this example, it is also possible to obtain the same effects as in previous examples by satisfying the conditional inequalities as previously described for the shape of phase grating and so on.

With the optical low-pass filter according to the present invention, it is possible to obtain substantially the same low-pass effects as at two periods or greater, because there is less change of spectrum intensity even if the aperture is two periods or less of phase grating.

Note that in above examples, even if the concave/convex shape of phase grating is reversed, the same effects can be also obtained.

Next, the relation between specific numerical values for the shape of the optical low-pass filter in the examples 1 and 2 of the present invention, and each conditional expression as previously described will be shown below.

| Numerical example 7 | Numerical example 8 |
| --- | --- |
| A = 0.188 | A = 0 |
| B = 0.188 | B = 0 |
| C = 0.47 | C = 0.47 |
| D = 0.47 | D = 0.47 |
| P = 1.88 | P = 1.88 |
| θ = 0.0378° | θ = 0.0378° |
| H = 0.00045 | H = 0.00045 |
| λ = 0.00055 | λ = 0.00055 |
| n = 1.49 | n = 1.49 |
| K = 60° | K = 60° |
| A/P = 0.1 | A/P = 0 |
| B/P = 0.1 | B/P = 0 |
| $\theta_r/\theta_f$ = 1.1 | $\theta_r/\theta_f$ = 1.1 |
| C/P = 0.25 | C/P = 0.25 |
| D/P = 0.25 | D/P = 0.25 |
| H/λ = 0.82 | H/λ = 0.82 |
| K = 60° | K = 60° |

An example of a further optical low-pass filter according to the present invention will be described below. The optical low-pass filter of the present invention as disclosed below, in which phase gratings trapezoidal in cross section are arrayed in succession at a pitch P in a one dimensional direction, is characterized in that a convex prism is provided at a position opposed to a phase grating in the central portion in an opposite plane of a plane where phase gratings of trapezoidal shape are formed, so that the refraction angle of the light flux passing through the inclined plane of phase grating in the central portion of the optical low-pass filter is smaller than that of the light flux passing through the inclined plane of phase grating in other regions.

The photographing system having the optical low-pass filter of the present invention is characterized in that when the optical low-pass filter in which phase gratings, trapezoidal in cross section, are arrayed in succession at the same pitch P in a one dimensional direction is provided on a portion of the photographing system, the convex prism portion is provided at a position opposed to a phase grating in the central region in an opposite plane of a plane where phase gratings of trapezoidal wave shape are formed, so that the refraction angle of the light flux passing through the inclined plane of phase grating faced to the central region including the aperture center of the photographing system is smaller than that of the light flux passing through the inclined plane of phase grating in different regions.

Figure 16A:
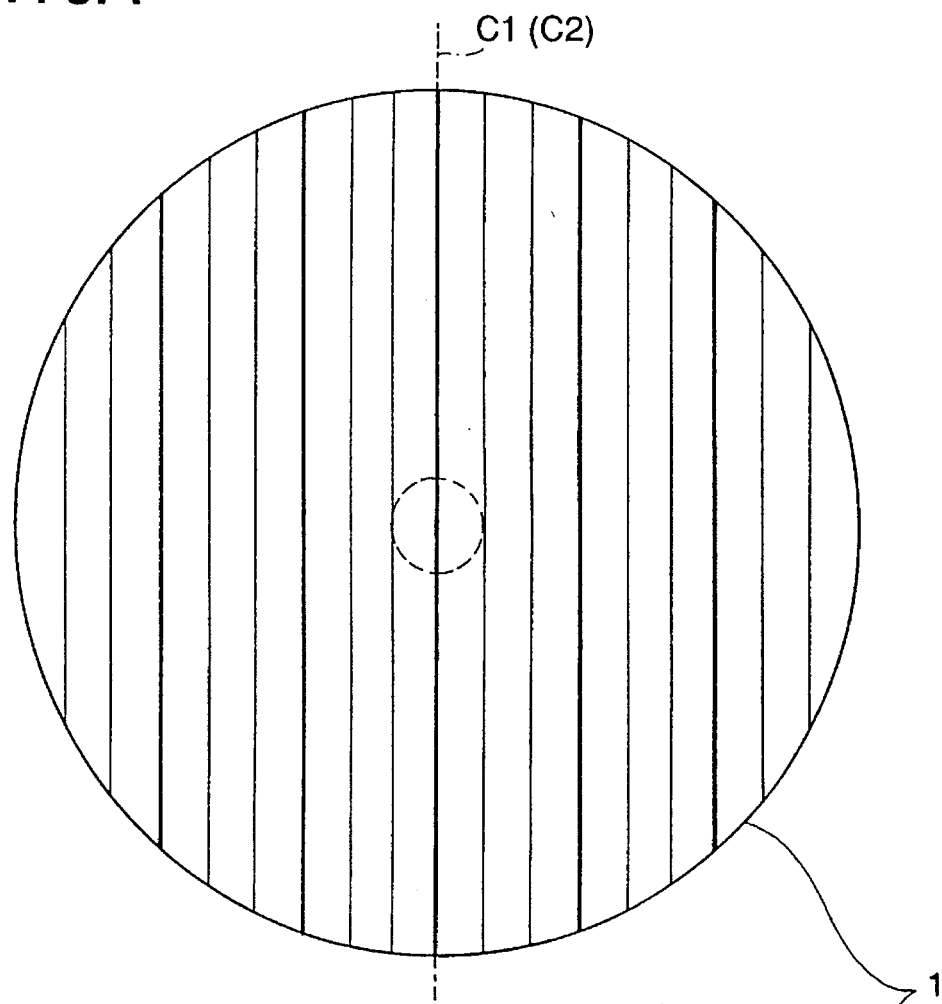
FIGS. 16A and 16B are an elevational view and a side view of a further optical low-pass filter according to the present invention.
Figure 16B:
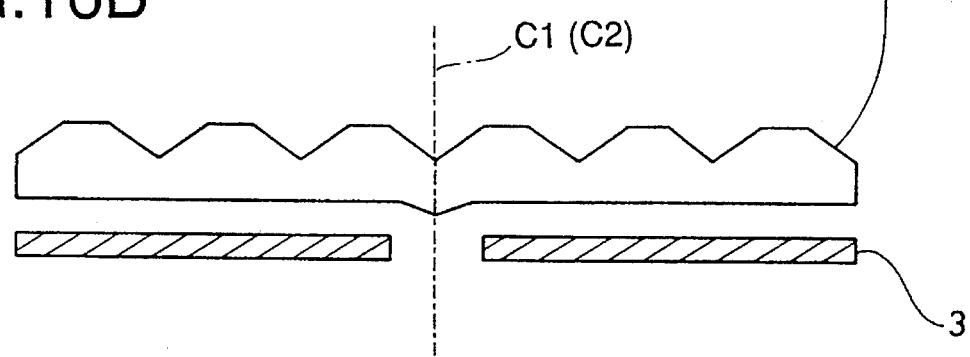
Figure 17:
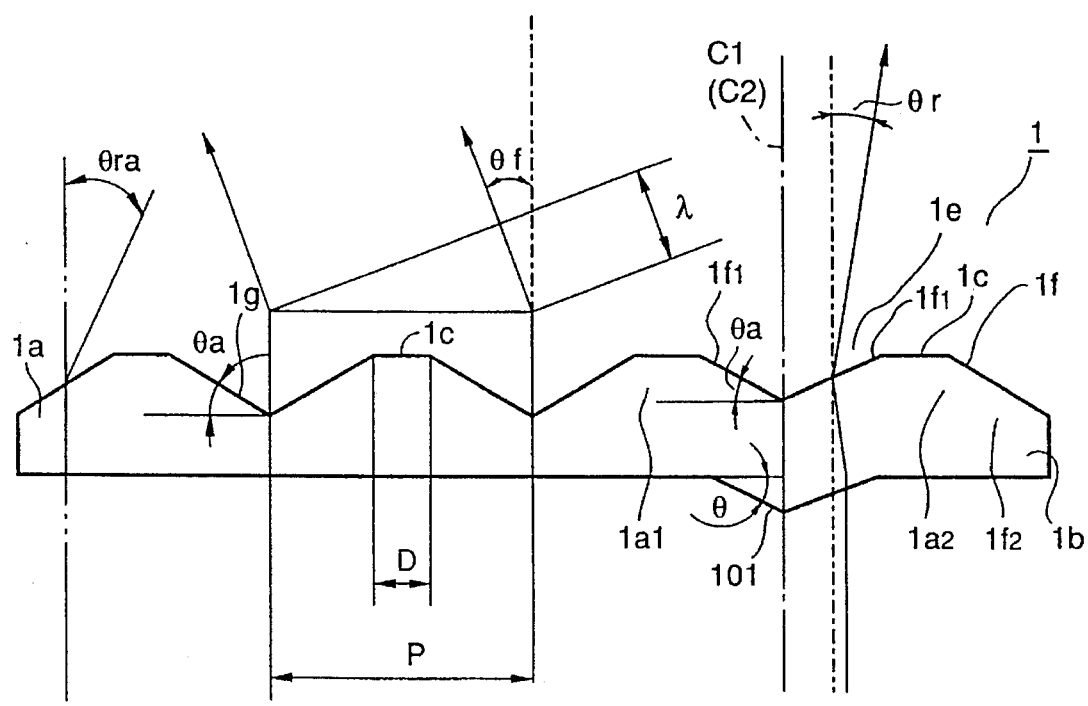
FIG. 17 is a schematic cross-sectional view of a portion of FIG. 16.

FIGS. 16A and 16B are an elevational view and a cross-sectional view of an optical low-pass filter in a further example of the present invention, and FIG. 17 is a schematic cross-sectional view of the optical low-pass filter according to the present invention.

In particular, in FIGS. 16 and 17, 1e is a central region when the phase gratings (trapezoid portions 1a) are arrayed, corresponding to a spacial region formed by the inclined planes 1f1 of two trapezoid portions 1a1, located left and right to the central line C1.

The convex prism 101 including the central line C1 at crest is provided in an opposite plane of a plane where phase gratings of trapezoidal wave shape are formed, so that the refraction angle $\theta_r$ of the light flux passing through the inclined plane 1f1 of the trapezoid portion 1a1 in the central region 1e is smaller than the refraction angle $\theta_{ra}$ of the light flux passing through the inclined plane 1g in other regions.

In this example, the optical low-pass filter is disposed in the photographing system such that its central line C1 is substantially coincident with the aperture center C2 of the aperture 3.

FIG. 17 shows an instance in which the optical low-pass filter 1 is disposed in the photographing system 2 so that the aperture center C2 of the aperture 3 is coincident with the central line C1 of the optical low-pass filter 1.

In this example, it is possible to readily obtain a constant low-pass effect even when the aperture diameter of the photographing system 2 is two periods or less of phase grating, in such a manner that the refraction angle $\theta_r$ of the light flux passing through the inclined plane 1f1 of phase grating in the central region 1e is smaller than the refraction angle $\theta_{ra}$ of the light flux passing through the inclined plane 1g of phase grating in other regions.

In particular, in this example, by specifying the shape of the optical low-pass filter and the attitude in disposing it in the photographing system, as above described, it is possible to readily obtain a predetermined low-pass effect in such a manner as to make smaller the aperture 3 for an object of high brightness, for example, effectively refracting the passing light flux even at less than two periods of phase grating, so as to prevent the optical performance from decreasing.

Besides, in the present invention, in order to obtain an excellent low-pass effect by disposing the optical low-pass filter in the photographing system, while preventing the optical performance from decreasing, the following conditions should be satisfied:

(i) Assuming that the refraction angle of the light flux passing through the inclined plane of the convex prism 101 and the inclined plane 1f1 of phase grating adjacent the central region, among the light flux incident at a right angle upon the substrate of the optical low-pass filter is $\theta_r$, the first order diffraction angle of the phase grating is $\theta_f$, the angle made by the inclined plane of the phase grating to the substrate is $\theta_a$, the angle made by the inclined plane of the convex prism to the substrate is $\theta$, the refractive index of the material of the phase grating is n, and the use wavelength is $\lambda$, the condition $$0.4 < \theta_r/\theta_f < 1.1 \quad (12)$$

must be satisfied, where $$\theta_r = (n-1)(\theta_a - \theta)$$

$$\theta_f = \sin^{-1}(\lambda/P)$$

If a lower limit of the conditional inequality (12) is exceeded, it is possible to determine the projection angle $\theta_r$, based on the principle of geometrical optics, when the aperture is reduced down to two periods or less of phase grating, for example, at which time the projection angle $\theta_r$ is greatly smaller than the first order diffraction angle $\theta_f$ phase grating, undesirably resulting in decreased low-pass effect.

If an upper limit of the conditional inequality (12) is exceeded, the projection angle $\theta_r$ of the first order diffracted light is conversely larger than the first order diffraction angle $\theta_f$ of phase grating, so that the resolution of the photographing system undesirably greatly decreases when the aperture of the photographing system is reduced down to two periods or less.

(ii) Assuming that the refraction angle of the light flux passing through the inclined plane of phase grating except for the central region, among the light flux incident at a right angle upon the substrate of the optical low-pass filter, is $\theta_{ra}$, the width of the crest flat portion of the phase grating is D, the first order diffraction angle of the phase grating is $\theta_f$, and the angle made by the inclined plane of the phase grating to the substrate is $\theta_a$, the conditions $$0.15 < D/P < 0.35 \quad (13)$$

$$1.1 < \theta_{ra}/\theta_f < 1.6 \quad (14)$$

must be satisfied, where $$\theta_{ra} = (n-1)\theta_a$$

Figure 19:
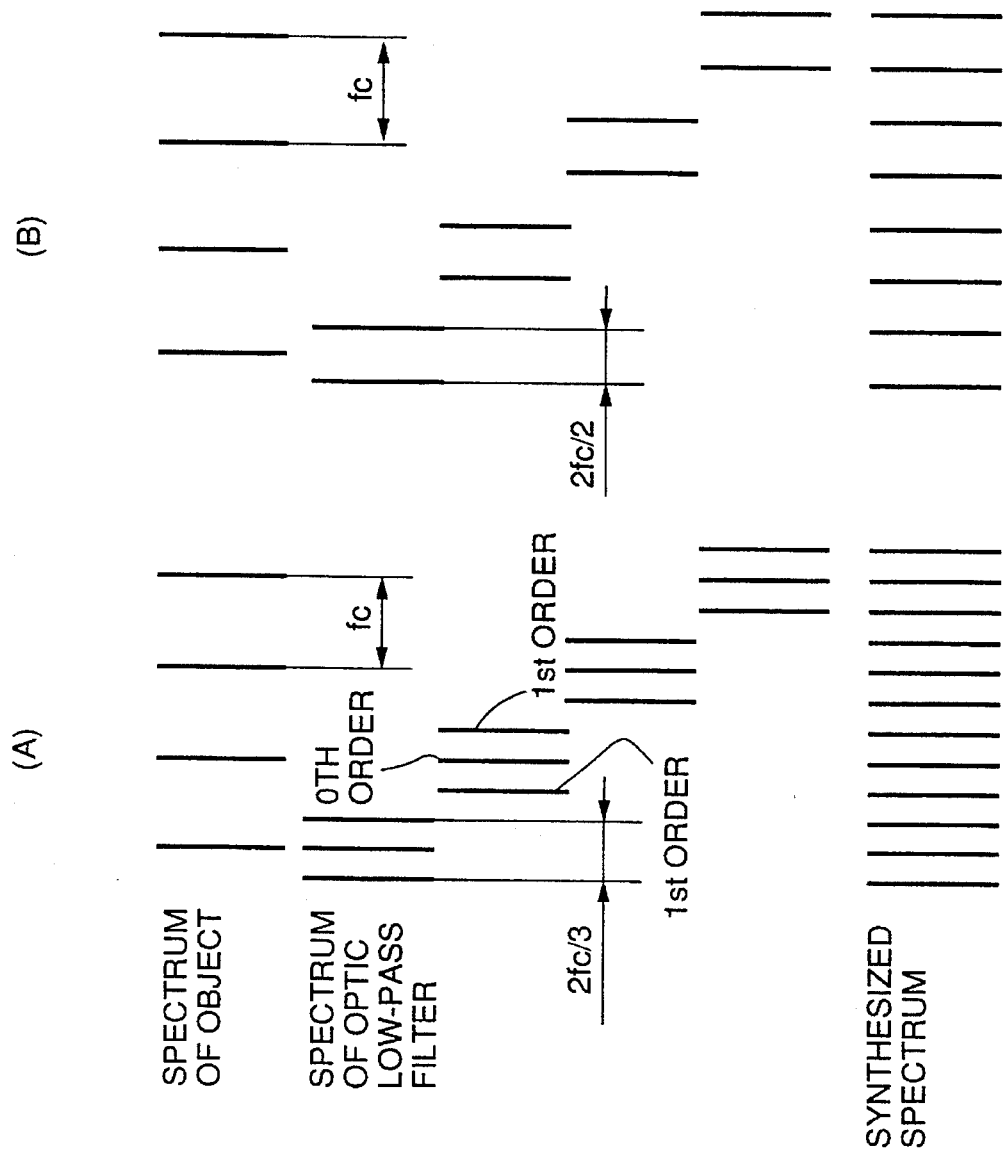
FIG. 19 is an explanation view of the spectrum of an optical low-pass filter.

Referring now to FIG. 19 showing the spectrum intensity of the optical low-pass filter, the conditional inequalities (13) and (14) will be described below. Note that in the same figure, $f_c$ indicates the cut-off frequency due to the low-pass effect.

The conditional inequalities (13) and (14) are concerned with the shape and characteristics of phase grating except for the central region, and define the conditions where the spectrum intensities for the zeroth order light and the first order diffracted light are substantially equal at a wavelength $\lambda$ of interest, as shown in FIG. 19(A), mainly based on the principle of wave optics.

Here, by making substantially equal the spectrum intensities for the zeroth order light and the first order diffracted light, the period of phase grating is smaller, as compared with a case as shown in FIG. 19(B) where there is only the first order diffracted light, with almost no intensity of the zeroth order light, to obtain the same low-pass effect. Thereby, even in the case of a small aperture of less than two periods of phase grating, it is possible to obtain a constant low-pass effect.

Here, supposing that the arbitrary cut-off frequency is $f_c$, the comparison is made between three spectra of equal intensity as shown in FIG. 19(A) and two spectra of equal intensity as shown in FIG. 19(B). If the interval between both spectrum ends (first order to first order spectrum interval) for two spectra is made $f_c/2$, and the interval between both spectrum ends (first order to first order spectrum interval) for three spectra is $2f_c/3$, it is possible to make MTF zero at the cut-off frequency $f_c$. That is, the period of phase grating can be reduced by 25% if three spectra are equal.

The conditional inequalities (13), (14) have been set in view of the above-mentioned respects. Below a lower limit of the conditional inequality (13), the width D of the crest flat portion is too narrow while the width of the inclined plane is wider, undesirably resulting in decreased resolution of the photographing system. Also, if the width D of the crest flat portion is too narrow, the spectrum characteristics are closer to those of triangular phase grating, so that the low-pass effect is undesirably greatly changed with the change of wavelength.

If the width D of the crest flat portion is too wide, beyond an upper limit of the conditional inequality (13), the spectrum intensity of the zeroth order light is larger than that of the first order diffracted light, undesirably resulting in decreased low-pass effect. Also, when the aperture is reduced down to two periods or less of phase grating, the area ratio of the crest flat portion within the aperture is too large, undesirably resulting in decreased low-pass effect.

If the refraction angle $\theta_{ra}$ is too much smaller than the first order diffraction angle $\theta_f$, below a lower limit of the conditional inequality (14), the intensity of the first order diffracted light is too much weaker than that of the zeroth order light, undesirably resulting in decreased low-pass effect.

If the refraction angle $\theta_{ra}$ is too much larger than the first order diffraction angle $\theta_f$, beyond an upper limit of the conditional inequality (14), the intensity of the first order diffracted light is too much stronger than that of the zeroth order light, undesirably resulting in decreased resolution of the photographing system.

(iii) The photographing system has a solid state image sensor, and assuming that the angle made by the phase grating direction of the optical low-pass filter to the horizontal scanning direction of the solid state image sensor is K, the following condition should be satisfied, as previously described, $$45° < K < 75°$$

Figure 20:
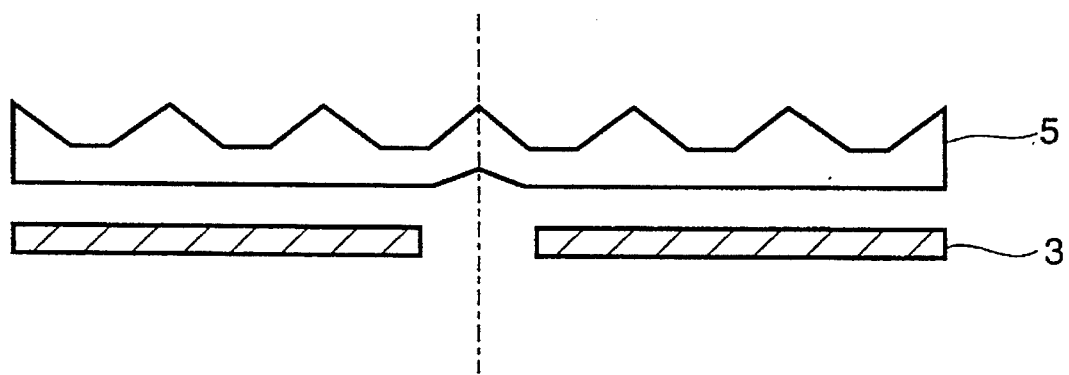
FIG. 20 is a cross-sectional view of an essential part of an optical low-pass filter according to the present invention.

FIG. 20 is a cross-sectional view of an essential part of an example of an optical low-pass filter according to the present invention. In this example, the concave/convex shape of trapezoid portion 1a of phase grating is reversed with respect to that as shown in FIG. 16B.

In this example, it is possible to obtain the same effects as in example 2 by satisfying the conditional inequalities as previously described, with a completely reversed shape of phase grating.

Figure 18:
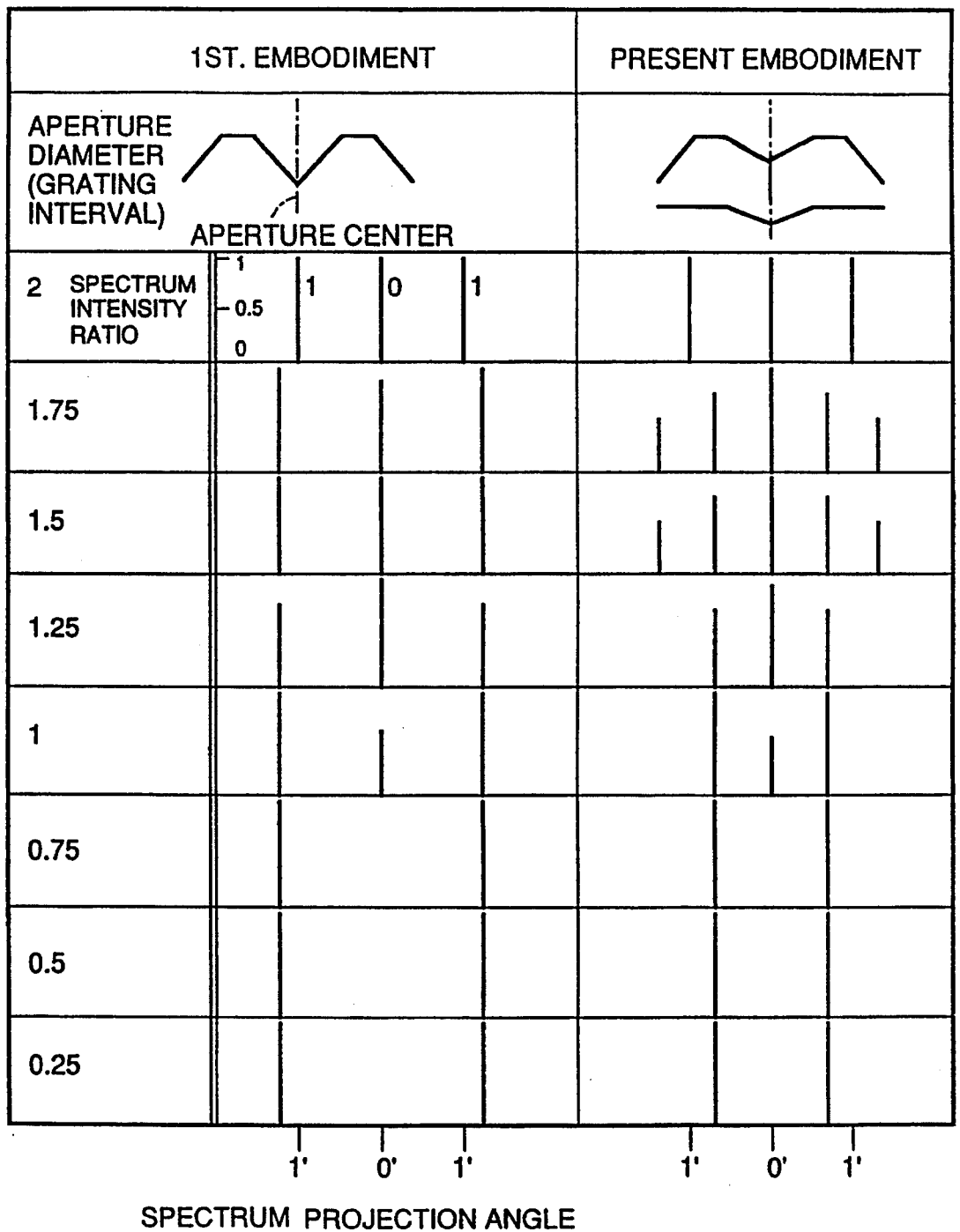
FIG. 18 is a view showing the spectrum intensity of an optical low-pass filter according to the present invention.

FIG. 18 is an explanation view showing the spectrum projection angle and the spectrum intensity when an optical low-pass filter of the present invention and the optical low-pass filter as described in the first example are used. In the same figure, the light flux is entered with variously changed aperture from two periods of phase grating to 0.25 period.

If the aperture is reduced down to 0.75 period or less of phase grating in the conventional optical low-pass filter as previously described, only the spectrum of the first order diffracted light exists, and the spectrum projection angle of the first order diffracted light is larger than that at two periods, so that the resolution of the photographing system slightly decreases.

On the contrary, with the optical low-pass filter as herein disclosed, the spectrum projection angle of the first order diffracted light is about 75% of that at two periods, even if the aperture is 0.75 period or less of phase grating, so that it is possible to obtain the same low-pass effects as at two periods even with the zeroth order light extinguished.

Next, the relation between specific numerical examples of the optical low-pass filter according to the present invention, the numerical example of the conventional optical low-pass filter, and each conditional expression as previously described will be shown below.

| | Numerical example 9 | Numerical example 10 | Numerical example 11 |
|---|---|---|---|
| P | 1.88 | 1.88 | 1.88 |
| A | 0.47 | 0.376 | 0.564 |
| θ | 0.0208° | 0.0293° | 0.0123° |
| n | 1.49 | 1.49 | 1.49 |
| λ | 0.00055 | 0.00055 | 0.00055 |
| $θ_a$ | 0.0463° | 0.0463° | 0.0463° |
| K | 60° | 65° | 55° |
| $θ_r/θ_f$ | 0.744 | 0.496 | 0.992 |
| D/P | 0.25 | 0.2 | 0.3 |
| $θ_{ra}/θ_f$ | 1.35 | 1.35 | 1.35 |
| K | 60° | 65° | 55° |

As example of an improved optical low-pass filter according to the present invention will be described below.

The photographing system having the optical low-pass filter as will be described below is characterized in that when phase gratings trapezoidal in cross section are arrayed in a succession at a pitch P in one dimensional direction, the optical low-pass filter is disposed on a portion of the photographing system in such a manner that it is divided into two regions at a boundary of the central portion in the array direction of phase gratings, and two divided low-pass filter portions are then shifted one pitch or less in the array direction of the phase gratings, with respect to each other, so that the boundary portion or crest flat portion of phase grating for one low-pass filter portion is located at the aperture center of the aperture for the photographing system.

Figure 21A:
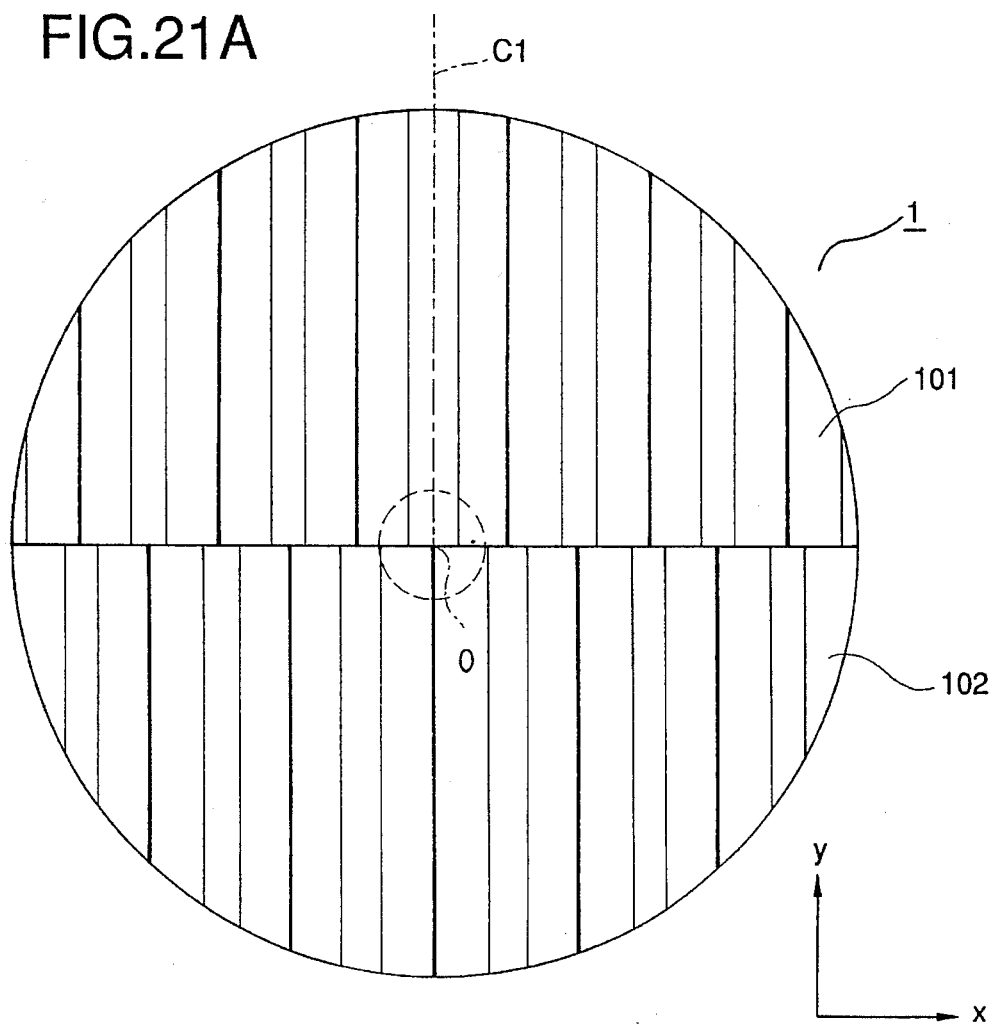
FIGS. 21A and 21B are an elevational view and a side view of a further optical low-pass filter according to the present invention.
Figure 21B:
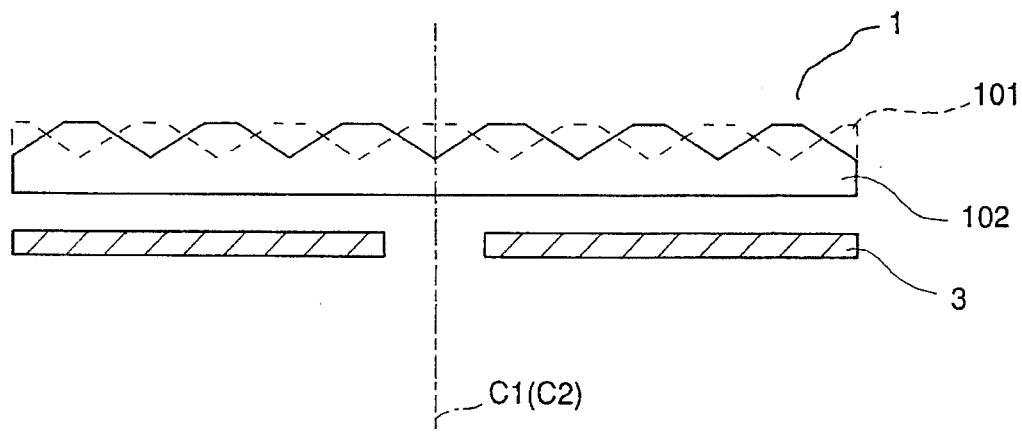
Figure 22:
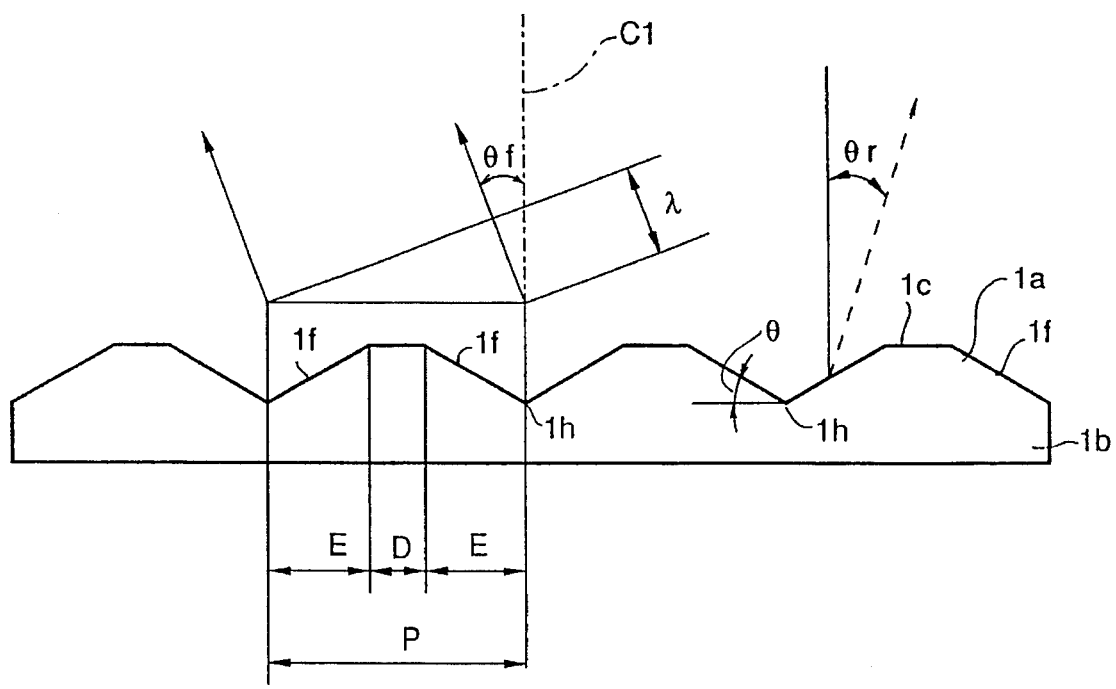
FIG. 22 is a schematic cross-sectional view of a portion of FIG. 21.
Figure 23:
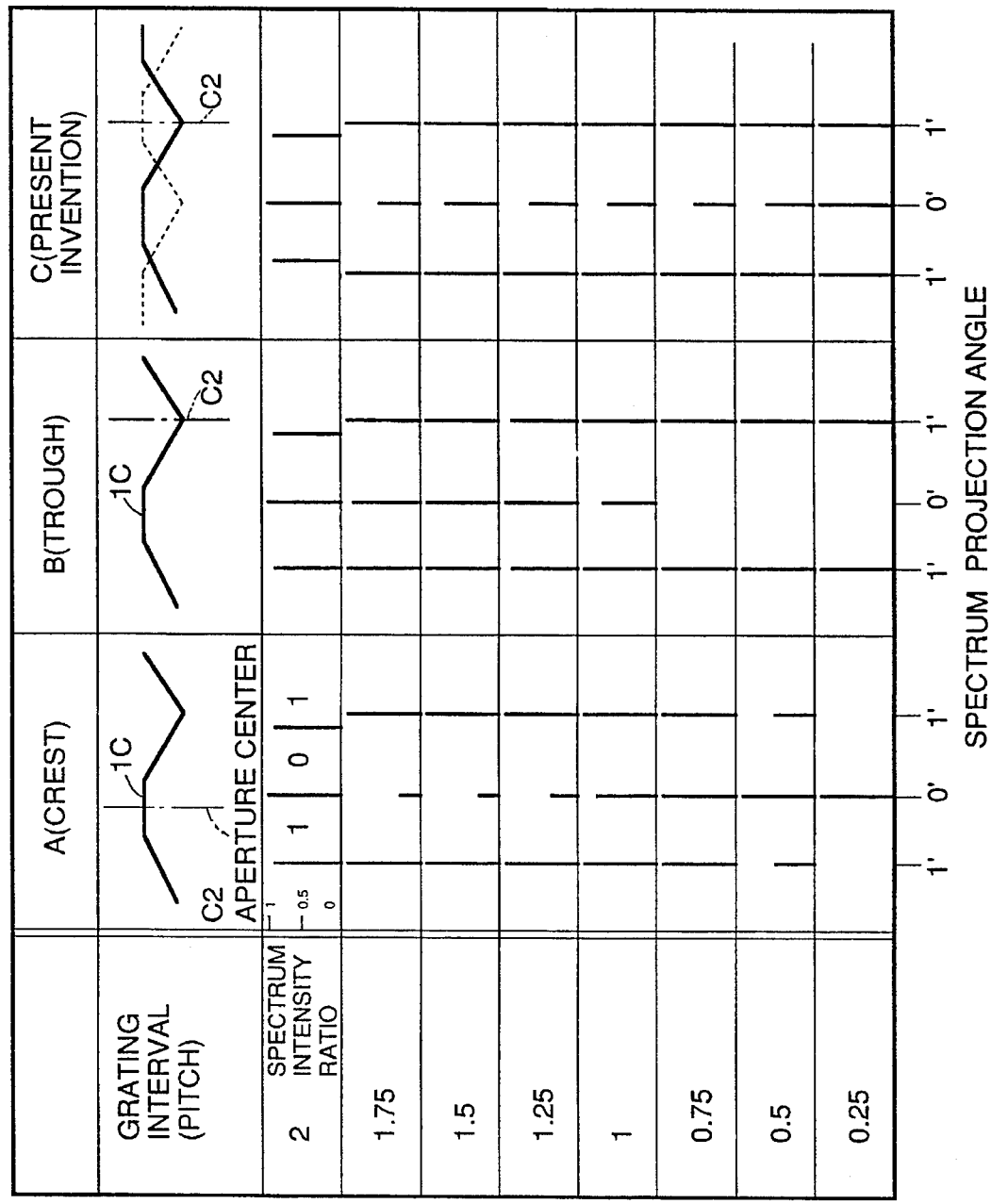
FIG. 23 is a comparison view of the spectrum intensity between an optical low-pass filter according to the present invention and an optical low-pass filter having no phase shift.

FIGS. 21A and 21B are an elevational view and a cross-sectional view of an optical low-pass filter of the present invention, FIG. 22 is a schematic cross-sectional view of the optical low-pass filter according to the present invention, and FIG. 23 is a schematic view of an essential part of the photographing system having the optical low-pass filter according to the present invention.

In the figure, 1 is an optical low-pass filter, its cross-section being such that phase gratings of the trapezoidal wave shape are arranged in succession.

The optical low-pass filter 1 is arranged in such a manner as to divide it into two regions at the boundary of the central portion O in the array direction (x direction) of phase grating, and the divided two low-pass filter portions 101, 102 are shifted one pitch or less in the array direction (x direction) of phase grating, with respect to each other, that is, phase shifted. In the same figure, they are shifted ½ pitch P of the phase grating.

As shown in FIG. 22, the optical low-pass filter is one in which the trapezoid portion 1a is composed of a crest flat portion 1c having width D and inclined planes 1f having length E when projected onto the substrate 1b.

C1 is a central line of the optical low-pass filter, which is coincident with a boundary portion 1h of phase grating in one low-pass filter portion. C2 is an aperture center of the aperture 3 in the photographing system 2.

In this example, the optical low-pass filter is disposed in the photographing system so that the central line C1 (boundary portion) of one low-pass filter portion 102, of and two low-pass filter portions 101, 102 constituting the optical low-pass filter 1, is substantially coincident with the aperture center C2 of the aperture 3.

In this example, by specifying the shape of optical low-pass filter and the attitude in disposing it in the photographing system, as above described, it is possible to readily obtain a predetermined low-pass effect in such a manner as to make smaller the aperture 3 for an object of high brightness, for example, effectively refracting the passing light flux by balancing the area ratio of the crest flat portion 1c of trapezoidal wave to the inclined plane 1f, even if the passing light flux is less than two periods of phase grating, so as to prevent optical performance from decreasing.

Besides, in the present invention, in order to obtain an excellent low-pass effect by disposing the optical low-pass filter in the photographing system, while preventing the optical performance from decreasing, the following conditions should be satisfied:

(i) Assuming that the refraction angle of the light flux passing through the inclined plane of phase grating among the light flux incident at a right angle upon the substrate of the optical low-pass filter is $θ_r$, the first order diffraction angle of the phase grating is $θ_f$, the angle made by the inclined plane of the phase grating to the substrate is θ, the refractive index of the material of the phase grating is n, the use wavelength is λ, and the width of the crest flat portion of the phase grating is D, the conditions, $$0.15 < D/P < 0.35 \tag{14}$$

$$0.5 < θ_r/θ_f < 1.4 \tag{15}$$

must be satisfied, where $$θ_r = (n-1)θ$$

$$θ_f = \sin^{-1}(λ/P)$$

If a lower limit of the conditional inequality (14) is exceeded, the area ratio of the crest flat portion is reduced when the aperture is made smaller than two periods of phase grating, so that the spectrum of the zeroth order light is weakened, and the resolution of the photographing system undesirably decreases.

If an upper limit is exceeded, the area ratio of the crest flat portion is too larger, when the aperture is made smaller than two periods of phase grating, so that the spectrum of the zeroth order light is too much stronger than the spectrum of the first order diffracted light, and the low-pass effect undesirably decreases.

If a lower limit of the conditional inequality (15) is exceeded, the projection angle $θ_r$ of the first order diffracted light (which is coincident with the refraction angle of the inclined plane of phase grating) in the aperture of two periods or less dominated by the principle of geometrical optics is smaller than the projection angle $\theta_r$ of the first order diffracted light (which is coincident with the first order diffracted light of phase grating) in the aperture of two periods or greater of phase grating dominated by the principle of wave optics, so that the low-pass effect decreases. In particular, even if the area ratio of the crest flat portion and that of the inclined plane are substantially equal, and the intensities of the zeroth order light and the first order diffracted light are equal, the low-pass effect may decrease.

On the contrary, if the projection angle $\theta_r$ of the first order diffracted light is larger than the diffraction angle $\theta_f$, beyond an upper limit of the conditional inequality (15), the resolution of the photographing system undesirably decreases, when the aperture is made smaller than two periods of phase grating.

FIG. 23 is an explanation view showing the spectrum projection angle and the spectrum intensity when an optical low-pass filter (C) of the present invention and the optical low-pass filters (A), (B) having the cross section of trapezoidal wave shape without phase shift are used.

FIG. 23(A) shows an instance where the aperture center C2 is located at a center of the crest flat portion of the trapezoidal wave shape, and FIG. 23(B) shows an instance where the aperture center C2 is located at a boundary of trapezoidal wave shape. The optical low-pass filters (A), (B) have the same shape as in the numerical example as will be described later, except that no phase shift is made.

In the same figure, the light flux enters with variously changed aperture from two periods of phase grating to 0.25 period.

In the optical low-pass filter (A), when the aperture is within a range from 1.5 to 1.75 periods of phase grating, the intensity of the zeroth order light is weakened as compared with the first order diffracted light, so that the resolution of the photographing system decreases. Also, at 0.5 period or less, the intensity of the zeroth order light is too strong conversely, resulting in slightly decreased low-pass effect.

In the optical low-pass filter (B), when the aperture is made smaller than 0.75 period of phase grating, the zeroth order light disappears, resulting in decreased resolution of the photographing system.

Thus, in the optical low-pass filters (A), (B), the low-pass effect or the resolution of the photographing system often decreases depending on the aperture diameter, when the aperture diameter is less than about two periods of phase grating.

On the contrary, in the optical low-pass filter (C) as described herein, there is less change of the spectrum intensity even when the aperture is less than two periods of phase grating, with the intensities of the zeroth order light and the first order diffracted light excellently balanced, whereby it is possible to obtain substantially the same low-pass effects as at two periods or greater.

In the above examples, when two low-pass filter portions 101, 102 are shifted ½ pitch P in the x direction, it is possible to obtain the same effects as previously described, even if the aperture center C2 is located substantially at the center of the crest flat portion 1c, instead of the boundary portion 1h of trapezoidal wave shape.

Figure 24:
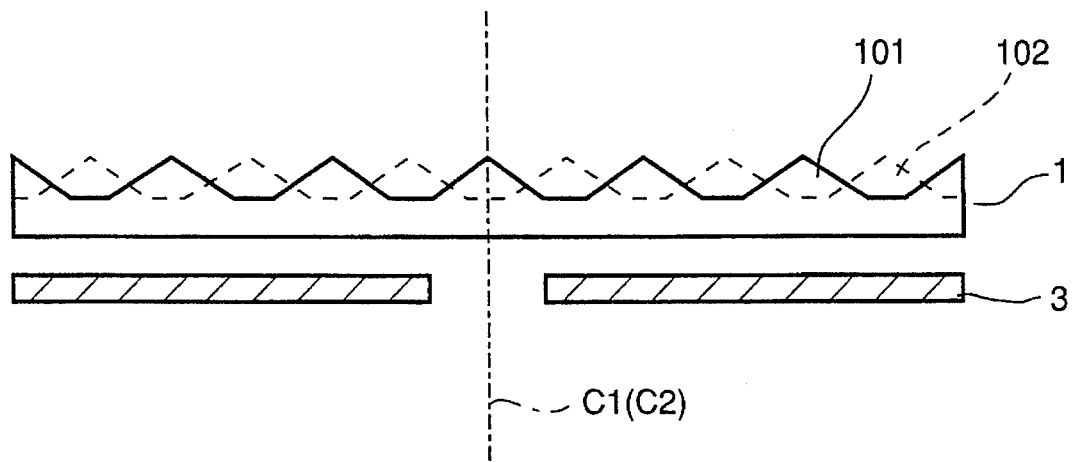
FIG. 24 is a cross-sectional view of an essential part of an example according to the present invention.

Also, in the above examples, even if the concave/convex shape of phase grating is completely reversed as shown in FIG. 24, it is possible to obtain the same effects.

Next, the relation between various numerical values concerning the shape of the optical low-pass filter and each conditional expression as previously described, will be shown below.

| Numerical example 12 | Numerical example 13 | Numerical example 14 |
| --- | --- | --- |
| P = 1.88 | P = 1.88 | P = 1.88 |
| D = 0.47 | D = 0.376 | D = 0.564 |
| E = 0.705 | E = 0.752 | E = 0.658 |
| θ = 0.0378° | θ = 0.030° | θ = 0.045° |
| n = 1.49 | n = 1.49 | n = 1.49 |
| λ = 0.00055 | λ = 0.00055 | λ = 0.00055 |
| K = 60° | K = 65° | K = 55° |
| D/P = 0.25 | D/p = 0.2 | D/P = 0.3 |
| $\theta_r/\theta_f$ = 1.1 | $\theta_r/\theta_f$ = 0.88 | $\theta_r/\theta_f$ = 1.32 |
| K = 60° | K = 65° | K = 55° |

According to the present invention, by setting each element of the optical low-pass filter as previously described, it is possible to obtain a constant low-pass effect at all times (even if the aperture is small and, for example, the light flux passes through a region corresponding to less than two periods of phase grating) that is, the aperture value is variously changed, when making a photograph by disposing the optical low-pass filter on a portion of the photographing system, as well as accomplishing an optical low-pass filter, and a photographing system having it which is capable of taking a photograph with excellent optical performance, with a better unfocused state in which the density or the number of sheets used for the ND filter can be reduced.

What is claimed is:

1. A photographing apparatus comprising:

taking lens means for determining an optical axis; and an optical member including a plurality of prism portions arrayed in succession at a predetermined pitch, wherein said optical member is arranged so that the optical axis is substantially located at a concave portion formed by one prism portion of said optical member and another prism portion adjacent said one prism portion, and wherein a cross section of each of said plurality of prism portions is of a trapezoidal shape, and wherein each of said trapezoidal-shaped prism portions has a slope plane and a top plane portion, and assuming that a width of said slope plane is B and a deviation amount between an apex of the concave portion and the optical axis is D, the following condition is satisfied:

|D|/B<0.33, and wherein assuming that the width of said top plane portion is A, the pitch is P, a first order diffraction angle of said optical member is $\theta_f$, and a refraction angle of said slope plane is $\theta_r$, the following further conditions are satisfied:

0.15<A/P<0.35, and 0.5<$\theta_r/\theta_f$<1.4.

2. The photographing apparatus according to claim 1, further comprising a stop with a changeable aperture, the center of the aperture being coincident with the optical axis.

3. A photographing apparatus comprising:

a taking lens, which determines an optical axis; and an optical low-pass filter comprising a pair of low-pass filter portions each including prism portions each having slope planes and a plane portion, which have a boundary portion between said prism portions that are adjacent, said prism portions being arrayed at a predetermined pitch P, wherein said low-pass filter portions are positioned adjacent to each other at an adjoining portion of said optical low-pass filter, and wherein said prism portions of one of said pair of low-pass filter portions are shifted with respect to said prism portions of the other of said pair of low-pass filter portions, along the adjoining portion, by a deviation amount of P/2, and wherein said optical low-pass filter is arranged so that the optical axis intersects the boundary portion of one of said prism portions.

4. The photographing apparatus according to claim 3, wherein assuming that a refraction angle of a light flux at said slope plane is $\theta_r$, and a first order diffraction angle of said optical filter is $\theta_f$, the following condition is satisfied:

$$0.5 < \theta_r/\theta_f < 1.4.$$

5. The photographing apparatus according to claim 3, wherein assuming that a width of said plane portion is D, the following condition is satisfied:

$$0.15 < D/P < 0.35.$$

6. A photographing apparatus comprising:

a taking lens, which determines an optical axis; and an optical low-pass filter comprising a pair of low-pass filter portions each including prism portions each having slope planes and a plane portion, which have a boundary portion between said prism portions that are adjacent, said prism portions being arrayed at a predetermined pitch P, wherein said low-pass filter portions are positioned adjacent to each other at an adjoining portion of said optical low-pass filter, and wherein said prism portions of one of said pair of low-pass filter portions are shifted with respect to said prism portions of the other of said pair of low-pass filter portions, along the adjoining portion, by a deviation amount, which is less than or equal to the pitch P of said prism portions, and wherein said optical low-pass filter is arranged so that the optical axis intersects the boundary portion of one of said prism portions, and wherein assuming that a refraction angle of a light flux at said slope planes is $\theta_r$, and a first order diffraction angle of said optical filter is $\theta_f$, the following condition is satisfied:

$$0.5 < \theta_r/\theta_f < 1.4.$$

7. The photographing apparatus according to claim 6, wherein the deviation amount is P/2.

8. The photographing apparatus according to claim 6, wherein assuming that a width of said plane portion is D, the following condition is satisfied:

$$0.15 < D/P < 0.35.$$

9. An apparatus comprising:

taking lens means having an aperture;

a stop for changing a diameter of the aperture; and an optical low-pass filter, including a plurality of prism portions disposed at a predetermined pitch, each of said prism portions having a top portion;

wherein a center of the aperture is substantially coincident with a center of one of said top portions; and wherein said apparatus satisfies the following relationship:

$$0.5 < \theta_r/\theta_f < 1.4,$$

wherein $\theta_f$ is the first-order diffraction angle of said optical low-pass filter and $\theta_r$ is the refraction angle of light of said slope forming said top portions.

10. An apparatus according to claim 9, wherein the first-order diffraction angle $\theta_f$ is substantially equal to the refraction angle $\theta_r$.

11. An apparatus comprising:

taking lens means; and an optical low-pass filter provided in an optical path of said taking lens means, said optical low-pass filter comprising a plurality of prism portions arranged in succession at a predetermined pitch, each of said prism portions having slope planes;

wherein said apparatus satisfies the relationship:

$$0.5 < \theta_r/\theta_f < 1.4,$$

wherein $\theta_f$ is the first-order diffraction angle of said optical low-pass filter and $\theta_r$ is the refraction angle of light of said slope planes.

12. An apparatus according to claim 11, wherein the first-order diffraction angle $\theta_f$ is substantially equal to the refraction angle $\theta_r$.

* * * * *

UNITED STATES PATENT AND TRADEMARK OFFICE
CERTIFICATE OF CORRECTION

PATENT NO. : 5,471,344
DATED : November 28, 1995
INVENTOR(S) : SABURO SUGAWARA

It is certified that error appears in the above-indentified patent and that said Letters Patent is hereby corrected as shown below:

ON THE COVER PAGE

[56] References Cited

FOREIGN PATENT DOCUMENTS

"52-92936 1/1981 Japan" should read
--56-2936 1/1981 Japan--.
"63-331323 12/1988 Japan" should read
--63-311323 12/1988 Japan--.

COLUMN 2

Line 34, "a a" should read --a--.

COLUMN 16

Line 14, "of and" should read --and of--.
Line 60, "larger," should read --large,--.

UNITED STATES PATENT AND TRADEMARK OFFICE
CERTIFICATE OF CORRECTION

PATENT NO. : 5,471,344

DATED : November 28, 1995

INVENTOR(S) : SABURO SUGAWARA

It is certified that error appears in the above-indentified patent and that said Letters Patent is hereby corrected as shown below:

COLUMN 18

No. 13, "D/p = 0.2" should read --D/P = 0.2--.
Line 21, "grating)" should read --grating,--.
Line 22, "changed," should read --changed)--.

Signed and Sealed this

Sixteenth Day of April, 1996

BRUCE LEHMAN

Attest:

Attesting Officer

Commissioner of Patents and Trademarks